(12) United States Patent
Suzuki et al.

(10) Patent No.: US 6,754,786 B2
(45) Date of Patent: Jun. 22, 2004

(54) MEMORY CONTROL CIRCUIT AND METHOD FOR ARBITRATING MEMORY BUS

(75) Inventors: Yoshito Suzuki, Tokyo (JP); Kouji Minami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 250 days.

(21) Appl. No.: 10/109,693

(22) Filed: Apr. 1, 2002

(65) Prior Publication Data

US 2003/0084255 A1 May 1, 2003

(30) Foreign Application Priority Data

Oct. 29, 2001 (JP) .................................. 2001-330155

(51) Int. Cl.⁷ .............................................. G06F 12/00
(52) U.S. Cl. .................................... 711/150; 710/240
(58) Field of Search .............................. 711/147, 150, 711/151, 168; 710/240

(56) References Cited

U.S. PATENT DOCUMENTS

| | | | | |
|---|---|---|---|---|
| 5,907,717 A | * | 5/1999 | Ellis ........................... | 710/56 |
| 6,098,124 A | * | 8/2000 | Odom ......................... | 710/52 |
| 6,205,524 B1 | | 3/2001 | Ng | |

FOREIGN PATENT DOCUMENTS

| | | |
|---|---|---|
| JP | 3033747 | 4/2000 |
| JP | 3137486 | 2/2001 |

* cited by examiner

*Primary Examiner*—Kevin Verbrugge
(74) *Attorney, Agent, or Firm*—Birch, Stewart, Kolasch & Birch, LLP

(57) ABSTRACT

A memory control circuit for controlling a memory bus and a memory includes buffers, counters, data transfer circuits, and a bus arbiter having a state machine. Each of the data transfer circuits transmits a request signal demanding start of the data transfer on the basis of at least one of the count values of the counters. If the data transfer circuit associated with the current state transmits the request signal, the bus arbiter transmits an acknowledge signal granting start of the data transfer. Each of the data transfer circuits starts the data transfer at receipt of the acknowledge signal, and stops the data transfer being executed on the basis of either number of pieces of data transferred after the receipt of the acknowledge signal or the count value of at least one of the counters. When the data transfer circuit associated with the current state either does not transmit the request signal or has stopped the data transfer, the bus arbiter does not transmit the acknowledge signal to the data transfer circuit associated with the current state, and transition of the current state takes place in accordance with the predetermined transition condition.

34 Claims, 11 Drawing Sheets

FIG.4

| ELAPSED TIME | STATE OF STATE MACHINE | COUNT VALUE OF COUNTER | | | | LEVEL OF REQUEST SIGNAL | | | | |
|---|---|---|---|---|---|---|---|---|---|---|
| | | FIRST COUNTER | SECOND COUNTER | THIRD COUNTER | FOURTH COUNTER | FIRST ACKNOWL-EDGE | SECOND ACKNOWL-EDGE | THIRD ACKNOWL-EDGE | FOURTH ACKNOWL-EDGE | FIFTH ACKNOWL-EDGE |
| 0 | DATA TRANSFER 1 | 32 | 32 | 32 | 32 | H | L | L | L | L |
| 38 | DATA TRANSFER 2 | 11 | 34 | 43 | 34 | L | H | L | L | L |
| 76 | DATA TRANSFER 3 | 23 | 5 | 55 | 37 | L | L | H | L | L |
| 114 | DATA TRANSFER 4 | 34 | 7 | 34 | 39 | L | L | L | H | L |
| 152 | REFRESH | 46 | 10 | 46 | 10 | L | L | L | L | H |
| 160 | DATA TRANSFER 1 | 48 | 10 | 48 | 10 | L | L | L | L | L |
| 198 | DATA TRANSFER 2 | 27 | 12 | 59 | 12 | L | L | L | L | L |
| 199 | DATA TRANSFER 3 | 28 | 12 | 60 | 12 | L | L | L | L | L |
| 237 | DATA TRANSFER 4 | 39 | 15 | 39 | 15 | L | L | L | L | L |
| 238 | REFRESH | 39 | 15 | 39 | 15 | L | L | L | L | H |
| 246 | DATA TRANSFER 1 | 42 | 15 | 42 | 15 | H | L | L | L | L |
| 284 | DATA TRANSFER 2 | 21 | 18 | 53 | 18 | L | L | L | L | L |
| 285 | DATA TRANSFER 3 | 22 | 18 | 54 | 18 | L | L | H | L | L |
| 323 | DATA TRANSFER 4 | 33 | 20 | 33 | 20 | L | L | L | L | L |
| 324 | REFRESH | 33 | 20 | 33 | 20 | L | L | L | L | H |
| 332 | DATA TRANSFER 1 | 36 | 21 | 36 | 21 | H | L | L | L | L |
| 370 | DATA TRANSFER 2 | 15 | 23 | 47 | 23 | L | L | L | L | L |
| 371 | DATA TRANSFER 3 | 15 | 23 | 47 | 23 | L | L | H | L | L |
| 409 | DATA TRANSFER 4 | 27 | 26 | 27 | 26 | L | L | L | L | L |
| 410 | REFRESH | 27 | 26 | 27 | 26 | L | L | L | L | H |
| 418 | DATA TRANSFER 1 | 29 | 26 | 29 | 26 | L | L | L | L | L |
| NUMBER OF TIMES ACKNOWLEDGE SIGNAL IS SET TO HIGH LEVEL | | | | | | 4 | 1 | 4 | 1 | 4 |

※ H…HIGH LEVEL, L…LOW LEVEL

US 6,754,786 B2

MEMORY CONTROL CIRCUIT AND METHOD FOR ARBITRATING MEMORY BUS

BACKGROUND OF THE INVENTION

The present invention relates to a method for arbitrating a memory bus, access to which is requested by a plurality of data transfer circuits, and a memory control circuit for controlling a memory bus and a memory connected to the memory bus using the above method. In particular, the present invention relates to a method for arbitrating a memory bus connected to a plurality of data transfer circuits suitable for real-time processing such as moving picture processing, and a memory control circuit for performing the above method.

Some video apparatuses incorporates a memory device such as an SDRAM (Synchronous DRAM) that uses a DRAM (Dynamic Random Access Memory) as a core in order to store video data for video signal processing. This type of memory device is usually arranged so that both the data writing operation and the data reading operation are carried out using the same memory bus. The memory device, in which a write request and a read request are produced at the same time, should be equipped with an arbitrating device for arbitrating the memory bus in order to enable data transfer on a selective and time-shared basis in response to these requests. Further, even when a dual port memory is used which enables simultaneous execution of the writing operation and the reading operation, if more than two data transfer circuits request the access to the memory bus at the same time, it is required that the memory device be equipped with an arbitrating device for arbitrating the memory bus.

One of methods for arbitrating a memory bus when a plurality of data transfer circuits request the access to the memory bus is disclosed in, for example, a Japanese Patent No. 3,033,747 publication. A memory control circuit arranged with use of this prior art technique is shown in FIG. 12.

In FIG. 12, a reference numeral 63 denotes a graphics data generation circuit for generating graphics data to be displayed on a display unit, a reference numeral 64 denotes a first SDRAM for storing the data generated by the graphics data generation circuit 63, a reference numeral 65 denotes a second SDRAM for storing the data generated by the graphics data generation circuit 63, a reference numeral 66 denotes a first display controller for transferring data stored in the first SDRAM 64 to a first display unit 71 (to be explained later), and a reference numeral 67 denotes a second display controller for transferring data stored in the second SDRAM 65 to a second display unit 72 (to be explained later). Further, in FIG. 12, a reference numeral 68 denotes a first memory bus which is used for transmitting and receiving data, addresses, commands and so on by the graphics data generation circuit 63, the first SDRAM 64 and the first display controller 66. Furthermore, in FIG. 12, a reference numeral 69 denotes a second memory bus which is used for transmitting and receiving data, addresses, commands and so on by the graphics data generation circuit 63, the second SDRAM 65 and the second display controller 67. Moreover, in FIG. 12, a reference numeral 70 denotes a bus arbiter which controls timing of data transfer executed by the graphics data generation circuit 63, the first display controller 66 and the second display controller 67 in order to arbitrate the first memory bus 68 and the second memory bus 69. Additionally, in FIG. 12, a reference numeral 71 denotes the first display unit which displays data transferred from the first display controller 66, and a reference numeral 72 denotes the second display unit which displays data transferred from the second display controller 67.

The prior art memory control circuit having the above-mentioned arrangements as shown in FIG. 12 operates as follows.

The graphics data generation circuit 63 generates graphics data to be displayed on the first display unit 71 and the second display unit 72. When completing generation of the graphics data to be displayed on the first display unit 71, the graphics data generation circuit 63 transmits a first write request signal to the bus arbiter 70 to write the graphics data into the first SDRAM 64. Further, the first display controller 66 incorporates a synchronization signal generation circuit for generating vertical and horizontal synchronization signals to drive the first display unit 71. The first display controller 66, whenever detecting a reference edge in the horizontal synchronization signal generated therein within an effective display period, transmits a first read request signal to the bus arbiter 70 to read out data stored in the first SDRAM 64 and to transfer it to the first display unit 71.

Similarly, when completing generation of graphics data to be displayed on the second display unit 72, the graphics data generation circuit 63 transmits a second write request signal to the bus arbiter 70 to write the graphics data into the second SDRAM 65. The second display controller 67 incorporates a synchronization signal generation circuit for generating vertical and horizontal synchronization signals to drive the second display unit 72. The second display controller 67, whenever detecting a reference edge in the horizontal synchronization signal generated therein within an effective display period, transmits a second read request signal to the bus arbiter 70 to read out data stored in the second SDRAM 65 and to transfer it to the second display unit 72. Generally, the period of the synchronization signal generated by the first display controller 66 is different from the period of the synchronization signal generated by the second display controller 67.

The bus arbiter 70 receives first and second write request signals generated by the graphics data generation circuit 63, a first read request signal generated by the first display controller 66, and a second read request signal generated by the second display controller 67. In response to four types of request signals received, the bus arbiter 70 generates four types of acknowledge signals for enabling execution of data transfer. More specifically, when data transfer is not executed in the first memory bus 68 during transmission of the first write request signal, the bus arbiter 70 transmits a first write acknowledge signal to the graphics data generation circuit 63. When data transfer is not executed in the first memory bus 68 during transmission of the second write request signal, the bus arbiter 70 transmits a second write acknowledge signal to the first display controller 66. When data transfer is not executed in the second memory bus 69 during transmission of the first read request signal, the bus arbiter 70 transmits a first acknowledge signal to the graphics data generation circuit 63. When data transfer is not executed in the second memory bus 69 during transmission of the second read request signal, the bus arbiter 70 transmits a second read acknowledge signal to the second display controller 67.

When receiving the first write acknowledge signal, the graphics data generation circuit 63 transfers data generated therein to the first SDRAM 64 via the first memory bus 68. When completing the data transfer, the graphics data generation circuit 63 stops transmission of the first write request signal to the bus arbiter 70. Further, when receiving the first read acknowledge signal, the first display controller 66 transfers data to be displayed for one horizontal period from the first SDRAM 64 to the first display controller 66 via the first memory bus 68. When completing the data transfer, the first display controller 66 stops transmission of the first read request signal to the bus arbiter 70. Further, the data transferred from the first SDRAM 64 to the first display controller 66 is transferred to the first display unit 71 together with the horizontal and vertical synchronization signals generated by the first display controller 66.

Similarly, when receiving the second write acknowledge signal, the graphics data generation circuit 63 transfers the generated data to the second SDRAM 65 via the second memory bus 69. When completing the data transfer, the graphics data generation circuit 63 stops transmission of the second write request signal to the bus arbiter 70. Meanwhile, when receiving the second read acknowledge signal, the second display controller 67 transfers data to be displayed for one horizontal period from the second SDRAM 65 to the second display controller 67 via the second memory bus 69. When completing the data transfer, the second display controller 67 stops transmission of the second read request signal to the bus arbiter 70. Further, the data transferred from the second SDRAM 65 to the second display controller 67 is transferred to the second display unit 72 together with the horizontal and vertical synchronization signals generated by the second display controller 67.

In the data transfer, the graphics data generation circuit 63, the first display controller 66 and the second display controller 67 generate addresses and commands necessary for the data transfer, and transmit the generated addresses and commands to the first or second SDRAM 64 or 65 via the first or second memory bus 68 or 69 respectively.

FIG. 13 is a timing chart for explaining how the bus arbiter 70 arbitrates the first memory bus 68 using the request signal and the acknowledge signal. In FIG. 13, the horizontal synchronization signal generated by the first display controller 66 has a negative polarity, and both of the request and acknowledge signals are high active signals.

As shown in FIG. 13, when detecting a falling edge as a reference edge in the horizontal synchronization signal at a timing $t_a$, the first display controller 66 turns the first read request signal to its high level to ask the bus arbiter 70 to execute the data transfer from the first display controller 66 to the first SDRAM 64. At this time, if the graphics data generation circuit 63 is executing the data transfer via the first memory bus 68 at the timing $t_a$, then the bus arbiter 70 keeps the level of the first read acknowledge signal low to prevent the first display controller 66 from executing the data transfer.

Next, when completing the data transfer at a timing $t_b$, the graphics data generation circuit 63 turns the first write request signal to its low level, as shown in FIG. 13. In response to this, the bus arbiter 70 turns the first write acknowledge signal to its low level and turns the first read acknowledge signal to its high level, thus causing the first display controller 66 to start the data transfer.

As shown in FIG. 13, when the graphics data generation circuit 63 again generates the first write request signal at a timing $t_c$, if the first display controller 66 is executing the data transfer, then the bus arbiter 70 keeps the level of the first write acknowledge signal low until a timing $t_d$ at which the first display controller 66 completes the data transfer, thereby preventing the graphics data generation circuit 63 from executing the data transfer.

In this case, the amount of data generated by the graphics data generation circuit 63 is not always constant. Thus, in the case where the amount of data to be transferred is small, when the graphics data generation circuit 63 has stopped the data transfer, the first read request signal still sometimes remains at its low level. This phenomenon corresponds to a situation at a timing $t_e$ shown in FIG. 13. At this time, the first memory bus 68 is in its idle state where no data transfer is executed, until any one of the first write request signal and the read request signal becomes high level (e.g., a duration from a timing $t_e$ to a timing $t_f$ shown in FIG. 13). Accordingly, when the level of the first read request signal is changed to high at the timing $t_f$, the bus arbiter 70 immediately turns the first read acknowledge signal to high level to cause the first display controller 66 to start the data transfer. In particular, if there is a possibility that both levels of the first write and read request signals are changed to high during the idle state of the first memory bus 68, it should be previously determined which request signals the bus arbiter 70 should preferentially respond to.

How to arbitrate the second memory bus 69 using the second write and read request signals as well as the second write and read acknowledge signals is also exactly the same as how to arbitrate the first memory bus 68. In this manner, two types of data transfer per one memory bus with the memory used as transfer destination and transfer source can be arbitrated.

In the aforementioned prior art memory control circuit, the memory bus arbitration is carried out on the assumption that always two data transfer circuits are connected to a single memory bus. Accordingly, the prior art memory control circuit has a problem that the number of memory devices is required to be the same as the number of display units as the final data transfer destinations and, therefore, when the number of display units is especially large, a large number of memory devices must be used. Generally, as the number of parts in an electric circuit increases, substrate area, cost, and so on are also undesirably increased.

SUMMARY OF THE INVENTION

It is an object of the present invention to provide a method for arbitrating a memory bus and a memory control circuit which can arbitrate a memory bus without failure even when a plurality of data transfer circuits request access to the memory bus at any given timing.

According to an aspect of the present invention, a memory control circuit for controlling a memory bus and a memory connected to the memory bus includes a plurality of buffers which temporarily store at least either of data to be transferred to the memory or data transferred from the memory; a plurality of counters having count values respectively, the count values corresponding to numbers of pieces of data stored in the plurality of buffers respectively; a plurality of data transfer circuits which perform data transfer between the memory and the plurality of buffers using the memory bus; and a bus arbiter including a state machine which has a plurality of states associated with the plurality of data transfer circuits respectively and sets one of the plurality of states as a current state, transition of the current state of the state machine taking place in accordance with a predetermined transition condition. (1) Each of the plurality of data transfer circuits transmits a request signal demanding start of the data transfer to the bus arbiter on the basis of at least one of the count values of the plurality of counters. (2) The data transfer circuit associated with the current state of the state machine transmits the request signal to the bus arbiter, the bus arbiter transmits an acknowledge signal granting start of the data transfer to the data transfer circuit associated with the current state of the state machine. (3) Each of the plurality of data transfer circuits starts the data transfer at receipt of the acknowledge signal from the bus arbiter in response to the request signal, and stops the data transfer being executed on the basis of either number of pieces of data transferred after the receipt of the acknowledge signal or the count value of at least one of the plurality of counters. (4) When the data transfer circuit associated with the current state of the state machine either does not transmit the request signal or has stopped the data transfer being executed, the bus arbiter does not transmit the acknowledge signal to the data transfer circuit associated with the current state of the state machine, and transition of the current state of the state machine to a renewed current state takes place in accordance with the predetermined transition condition. (5) The operations (1) to (4) are repeated. The above-mentioned memory control circuit can arbitrate a memory bus without failure even when a plurality of data transfer circuits request access to the memory bus at any given timing, thereby making it possible to transfer data without failure between the memory control circuit and an external circuit.

In the operation (2), the following operation may be performed. Even when the data transfer circuit associated with the current state of the state machine is transmitting the request signal, if specific at least one of the plurality of data transfer circuits associated with a state other than the current state of the state machine is transmitting the request signal, the bus arbiter does not transmit the acknowledge signal to the data transfer circuit associated with the current state of the state machine, and transition of the current state of the state machine to a renewed current state takes place in accordance with the predetermined transition condition. The above-mentioned memory control circuit can afford more opportunities to the data transfer circuit having higher priority.

Further, the memory control circuit may be constructed as follows. When the state machine has a plurality of states next to the current state, the state machine sets one of the plurality of states next to the current state as a renewed current state on the basis of the request signal transmitted by specific at least one of the plurality of data transfer circuits.

According to another aspect of the present invention, a memory control circuit for controlling a memory bus and a memory connected to the memory bus includes a plurality of buffers which temporarily store at least either of data to be transferred to the memory or data transferred from the memory; a plurality of counters having count values respectively, the count values corresponding to numbers of pieces of data stored in the plurality of buffers respectively; a plurality of data transfer circuits which perform data transfer between the memory and the plurality of buffers using the memory bus; and a bus arbiter including an instruction queue formed by a shift register. (1) Each of the plurality of data transfer circuits transmits a request signal demanding start of the data transfer to the bus arbiter on the basis of at least one of the count values of the plurality of counters. (2) If the bus arbiter has received the request signal from at least one of the plurality of data transfer circuits, the bus arbiter enters a data transfer instruction, which is associated with at least one of the plurality of data transfer circuits that has transmitted the request signal, into a tail of the instruction queue. (3) The bus arbiter transmits an acknowledge signal granting start of the data transfer to the data transfer circuit associated with a data transfer instruction held at ahead of the instruction queue. (4) Each of the plurality of data transfer circuits starts the data transfer at receipt of the acknowledge signal from the bus arbiter in response to the request signal, and stops the data transfer being executed on the basis of either number of pieces of data transferred after the receipt of the acknowledge signal or the count value of at least one of the plurality of counters. (5) When the data transfer circuit has stopped the data transfer, the bus arbiter deletes the data transfer instruction associated with the data transfer circuit that has stopped the data transfer from the instruction queue and the bus arbiter shifts contents of the instruction queue in a latter stage by one stage toward the head of the instruction queue. (6) The operations (1) to (5) are repeated.

In the operation (1), the following operation may be performed. Even when any of the plurality of data transfer circuits is transmitting the request signal, if specific at least one of the plurality of data transfer circuits other than the data transfer circuit that is transmitting the request signal, is transmitting the request signals or if the data transfer instruction associated with specific at least one of the plurality of data transfer circuits other than the data transfer circuit that is transmitting the request signal, is held in the instruction queue, the operation (2) is not executed so that the bus arbiter does not enter the data transfer instruction, which is associated with the data transfer circuit that is transmitting the request signal, into a tail of the instruction queue.

Further, the memory control circuit may be constructed as follows. Even when the data transfer instruction is held at the head of the instruction queue, if specific at least one of the plurality of data transfer circuits, which is other than the data transfer circuit associated with the data transfer instruction held at the head of the instruction queue, is transmitting the request signal or if the data transfer instruction associated with specific at least one of the plurality of data transfer circuits, which is other than the data transfer circuit associated with the data transfer instruction held at the head of the instruction queue, is held in the instruction queue, the operation (3) is not executed so that the bus arbiter does not transmit the acknowledge signal to the data transfer circuit associated with the data transfer instruction held at the head of the instruction queue.

According to further aspect of the present invention, a memory control circuit for controlling a memory bus and a memory connected to the memory bus includes a plurality of buffers which temporarily store at least either of data to be transferred to the memory or data transferred from the memory; a plurality of counters having count values respectively, the count values corresponding to numbers of pieces of data stored in the plurality of buffers respectively; a plurality of data transfer circuits which perform data transfer between the memory and the plurality of buffers using the memory bus; and a bus arbiter including an instruction queue formed by a shift register and a state machine which has a plurality of states each of which is associated with one of the plurality of data transfer circuits or the instruction queue. The state machine sets one of the plurality of states as a current state, and transition of the current state of the state machine takes place in accordance with a predetermined transition condition. At least one of the plurality of states of the state machine is associated with the instruction queue. Some of the plurality of data transfer circuits are associated with the plurality of states of the state machine respectively, and a remainder of the plurality of data transfer circuits is associated with the instruction queue. (1) Each of the plurality of data transfer circuits transmits a request signal demanding start of the data transfer to the bus arbiter on the basis of at least one of the count values of the plurality of counters. (2) When the data transfer circuit associated with the current state of the state machine transmits the request signal to the bus arbiter, the bus arbiter transmits an acknowledge signal granting start of the data transfer to the data transfer circuit associated with the current state of the state machine. (3) Each of the plurality of data transfer circuits starts the data transfer at receipt of the acknowledge signal from the bus arbiter in response to the request signal, and stops the data transfer being executed on the basis of either number of pieces of data transferred after the receipt of the acknowledge signal or the count value of at least one of the plurality of counters. (4) When the data transfer circuit associated with the current state of the state machine either does not transmit the request signal or has stopped the data transfer being executed, the bus arbiter does not transmit the acknowledge signal to the data transfer circuit associated with the current state of the state machine, and transition of the current state of the state machine to a renewed current state takes place in accordance with the predetermined transition condition. (5) Only when the current state of the state machine is associated with the instruction queue, at least a part of the data transfer instructions held in the instruction queue is executed sequentially from the head of the instruction queue, and after that transition of the current state of the state machine to a renewed current state takes place in accordance with the predetermined transition condition. (6) The operations (1) to (5) are repeated.

In the operation (5), the following operations may be performed. (5-1) If the bus arbiter receives the request signal from any of the plurality of data transfer circuits associated with the instruction queue, the bus arbiter enters the data transfer instruction associated with the data transfer circuit which has transmitted the request signal into the tail of the instruction queue. (5-2) The bus arbiter transmits the acknowledge signal granting start of the data transfer to the data transfer circuit associated with the data transfer instruction held at the head of the instruction queue. (5-3) Each of the data transfer circuits associated with the instruction queue starts the data transfer at receipt of the acknowledge signal from the bus arbiter in response to the request signal, and stops the data transfer being executed on the basis of either number of pieces of data transferred after the receipt of the acknowledge signal or the count values of at least one of the plurality of counters. (5-4) When the data transfer circuit has stopped the data transfer, the bus arbiter deletes the data transfer instruction associated with the data transfer circuit that has stopped the data transfer from the instruction queue and the bus arbiter shifts contents of the instruction queue in a latter stage by one stage toward the head of the instruction queue. (5-5) The operations (5-1) to (5-4) are repeated at least once.

In the operation (5-1), the following operations may be performed. Even when any of the plurality of data transfer circuits is transmitting the request signal, if specific at least one of the plurality of data transfer circuits other than the data transfer circuit that is transmitting the request signal, is transmitting the request signals or if the data transfer instruction associated with specific at least one of the plurality of data transfer circuits other than the data transfer circuit that is transmitting the request signal, is held in the instruction queue, the operation (5-2) is not executed so that the bus arbiter does not enter the data transfer instruction, which is associated with the data transfer circuit that is transmitting the request signal, into a tail of the instruction queue.

Further, the memory control circuit may be constructed as follows. Even when the data transfer instruction is held at the head of the instruction queue, if specific at least one of the plurality of data transfer circuits, which is other than the data transfer circuit associated with the data transfer instruction held at the head of the instruction queue, is transmitting the request signal or if the data transfer instruction associated with specific at least one of the plurality of data transfer circuits, which is other than the data transfer circuit associated with the data transfer instruction held at the head of the instruction queue, is held in the instruction queue, the operation (5-3) is not executed so that the bus arbiter does not transmit the acknowledge signal to the data transfer circuit associated with the data transfer instruction held at the head of the instruction queue.

Further, the memory control circuit may be constructed as follows. Even when the data transfer instruction is held in the instruction queue associated with the current state of the state machine, if specific at least one of data transfer circuits associated with states of the state machine other than the current state is transmitting their request signal, transition of the current state of the state machine takes place in accordance with the predetermined transition condition, and the bus arbiter does not transmit the acknowledge signal to the data transfer circuit associated with the data transfer instruction held at the head of the instruction queue.

Furthermore, the memory control circuit may be constructed as follows. Even while the data transfer circuit is executing data transfer, if specific at least one of the data transfer circuits other than the data transfer circuit which is executing the data transfer starts transmission of the request signals, the bus arbiter issues an instruction to the data transfer circuit which is executing the data transfer to stop the data transfer being executed.

Also, the memory control circuit may be constructed as follows. Each of the plurality of counters generates the count value on the basis of a read instruction to each of the plurality of buffers, a write instruction to the plurality of buffers, a read instruction to the memory, and a write instruction to the memory.

Moreover, the memory control circuit may be constructed as follows. Each of the plurality of counters includes an inverted-pulse generation circuit for generating a pulse inverted each time the read or write instruction to the plurality of buffers is issued and a differentiation circuit for detecting an edge in the pulse generated by the inverted-pulse generation circuit, and each of the plurality of counters generates the count value on the basis of a detection result of the differentiation circuit, the read instruction to the memory, and the write instruction to the memory.

Further, the memory control circuit may be constructed as follows. Each of the plurality of data transfer circuits generates the request signal, when the count value of each of the plurality of data transfer circuits becomes above or below a predetermined set value.

Furthermore, the memory control circuit may be constructed as follows. Each of the plurality of data transfer circuits stops the data transfer, when the count value of each of the plurality of data transfer circuits becomes above or below a predetermined set value.

In addition, the memory control circuit may be constructed as follows. In any of the plurality of data transfer circuits which considers the memory as a transfer source and considers the buffer as a transfer destination, if all the data stored in the buffer as the transfer destination is deleted in compliance with an external signal, number of pieces of data to be transferred one time by the data transfer circuit through a predetermined duration is made smaller than number of pieces of data to be transferred through a duration other than the predetermined duration, or the number of times the acknowledge signal is transmitted by said bus arbiter in response to the request signal transmitted by said data transfer circuit is made smaller through a predetermined duration than the number of times the acknowledge signal is transmitted by said bus arbiter in response to the request signal transmitted by said data transfer circuit through the duration other than the predetermined duration.

According to another aspect of the present invention, a method for arbitrating a memory bus includes the steps of (1) transmitting a request signal demanding start of the data transfer from each of the plurality of data transfer circuits to the bus arbiter on the basis of at least one of the count values of the plurality of counters, and (2) transmitting an acknowledge signal granting start of the data transfer from the bus arbiter to the data transfer circuit associated with the current state of the state machine, if the data transfer circuit associated with the current state of the state machine transmits the request signal to the bus arbiter. The method further includes the steps of (3) starting the data transfer of each of the plurality of data transfer circuits at receipt of the acknowledge signal from the bus arbiter in response to the request signal, and stopping the data transfer being executed on the basis of either number of pieces of data transferred after the receipt of the acknowledge signal or the count value of at least one of the plurality of counters, (4) not transmitting the acknowledge signal to the data transfer circuit associated with the current state of the state machine, when the data transfer circuit associated with the current state of the state machine either does not transmit the request signal or has stopped the data transfer being executed, transition of the current state of the state machine to a renewed current state taking place in accordance with the predetermined transition condition, and (5) repeating the steps (1) to (4).

According to yet another aspect of the present invention, a method for arbitrating a memory bus includes the steps of (1) transmitting a request signal demanding start of the data transfer from each of the plurality of data transfer circuits to the bus arbiter on the basis of at least one of the count values of the plurality of counters, (2) entering a data transfer instruction, which is associated with at least one of the plurality of data transfer circuits that has transmitted the request signal, into a tail of the instruction queue, if the bus arbiter has received the request signal from at least one of the plurality of data transfer circuits, and (3) transmitting an acknowledge signal granting start of the data transfer from the bus arbiter to the data transfer circuit associated with a data transfer instruction held at a head of the instruction queue. The method further includes the steps of (4) starting the data transfer of each of the plurality of data transfer circuits at receipt of the acknowledge signal from the bus arbiter in response to the request signal, and stopping the data transfer being executed on the basis of either number of pieces of data transferred after the receipt of the acknowledge signal or the count value of at least one of the plurality of counters, (5) deleting the data transfer instruction associated with the data transfer circuit that has stopped the data transfer from the instruction queue, and shifting contents of the instruction queue in a latter stage by one stage toward the head of the instruction queue, when the data transfer circuit has stopped the data transfer, and (6) repeating the steps (1) to (5).

According to yet another aspect of the present invention, a method for arbitrating a memory bus includes the steps of (1) transmitting a request signal demanding start of the data transfer from each of the plurality of data transfer circuits to the bus arbiter on the basis of at least one of the count values of the plurality of counters, (2) transmitting an acknowledge signal granting start of the data transfer to the data transfer circuit associated with the current state of the state machine, when the data transfer circuit associated with the current state of the state machine transmits the request signal to the bus arbiter, and (3) starting the data transfer of each of the plurality of data transfer circuits at receipt of the acknowledge signal from the bus arbiter in response to the request signal, and stopping the data transfer being executed on the basis of either number of pieces of data transferred after the receipt of the acknowledge signal or the count value of at least one of the plurality of counters. The method further includes the steps of (4) not transmitting the acknowledge signal to the data transfer circuit associated with the current state of the state machine, when the data transfer circuit associated with the current state of the state machine either does not transmit the request signal or has stopped the data transfer being executed, transition of the current state of the state machine to a renewed current state taking place in accordance with the predetermined transition condition, (5) executing at least a part of the data transfer instructions held in the instruction queue sequentially from the head of the instruction queue, only when the current state of the state machine is associated with the instruction queue, after that transition of the current state of the state machine to a renewed current state taking place in accordance with the predetermined transition condition, and (6) repeating the steps (1) to (5).

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 4 is a diagram showing time variations in the number of pieces of data stored in four buffers used in the first embodiment;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
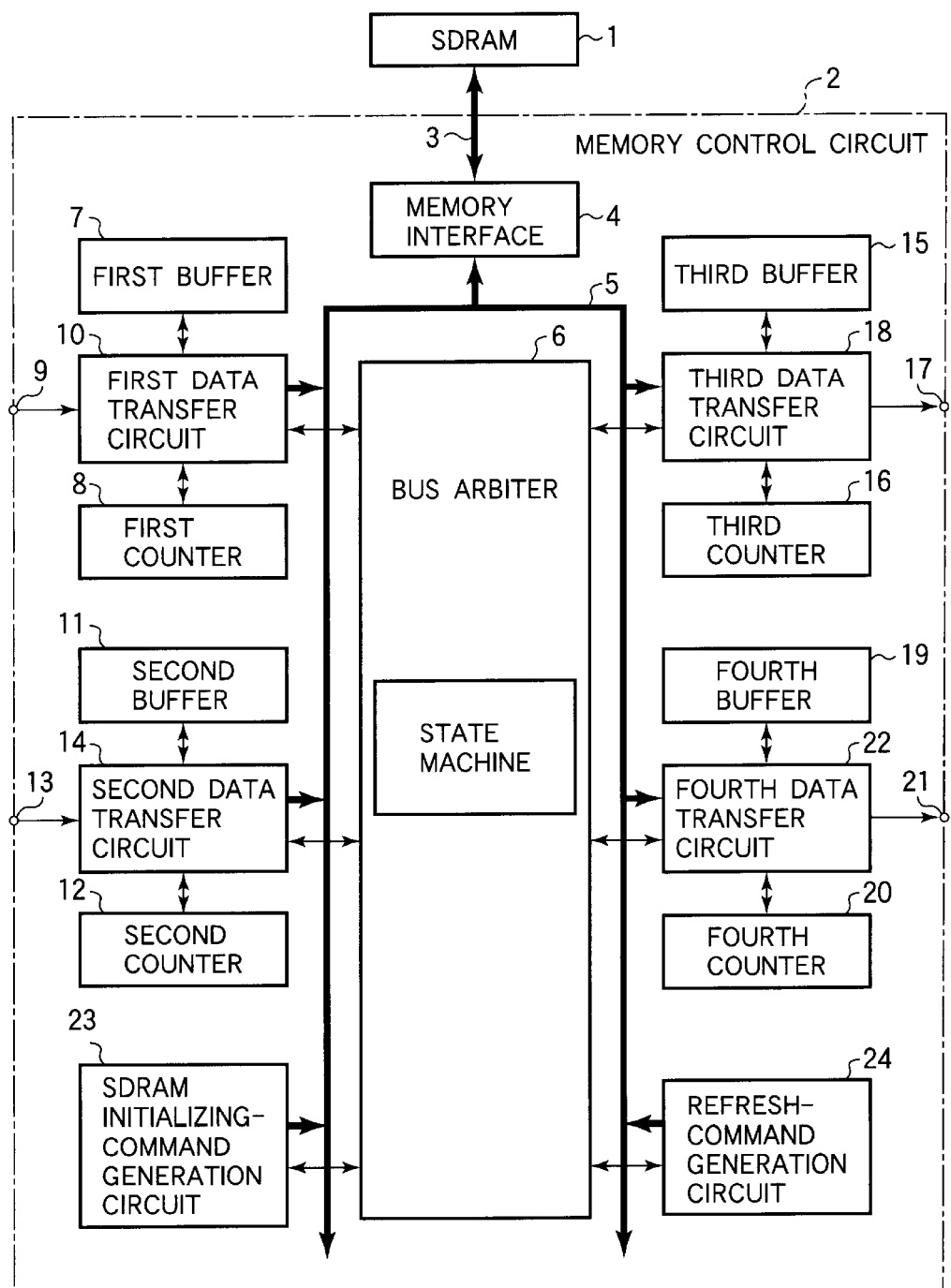
FIG. 1 is a diagram showing an arrangement of a memory control circuit (or an arrangement for performing a method for arbitrating a memory bus) in accordance with a first embodiment of the present invention.

FIG. 1 is a diagram showing an arrangement of a memory control circuit (or an arrangement for performing a method for arbitrating a memory bus) in accordance with a first embodiment of the present invention. In FIG. 1, a reference numeral 1 denotes an SDRAM for storing video data, a reference numeral 2 denotes a memory control circuit, and a reference numeral 3 denotes an external memory bus connected between the SDRAM 1 and the memory control circuit 2 so that the SDRAM 1 transmits and receives data, addresses and commands to and from the memory control circuit 2.

As shown in FIG. 1, the memory control circuit 2 includes a memory interface 4 having a direct interface with the SDRAM 1, an internal memory bus 5 for use in the interior of the memory control circuit 2 to transmit data, addresses, commands and so on, and a bus arbiter 6 for controlling timing of data transfer carried out by each data transfer circuit to arbitrate the internal memory bus 5.

Further, as shown in FIG. 1, the memory control circuit 2 includes a first buffer 7 for temporarily storing data to be transmitted to the SDRAM 1, a first counter 8 for counting number of pieces of data stored in the first buffer 7, and a first input terminal 9 for receiving data and control signals. The memory control circuit 2 also includes a first data transfer circuit 10 which writes data received from the first input terminal 9 into the first buffer 7 at any time and, when the bus arbiter 6 grants execution of data transfer using the internal memory bus 5, which reads out data from the first buffer 7 and transfers it to the SDRAM 1 via the memory interface 4.

Similarly, as shown in FIG. 1, the memory control circuit 2 includes a second buffer 11 for temporarily storing data to be transferred to the SDRAM 1, a second counter 12 for counting number of pieces of data stored in the second buffer 11, and a second input terminal 13 for receiving data and control signals. The memory control circuit 2 also includes a second data transfer circuit 14 which writes data received from the second input terminal 13 into the second buffer 11 at any time and, when the bus arbiter 6 grants execution of data transfer using the internal memory bus 5, which reads data from the second buffer 11 and transfers it to the SDRAM 1 via the memory interface 4.

Similarly, as shown in FIG. 1, the memory control circuit 2 includes a third buffer 15 for temporarily storing data transferred from the SDRAM 1, a third counter 16 for counting number of pieces of data stored in the third buffer 15, and a first output terminal 17 for outputting data and control signals. The memory control circuit 2 also includes a third data transfer circuit 18, when the bus arbiter 6 grants execution of data transfer using the internal memory bus 5, which writes data into the third buffer 15 from the SDRAM 1 via the memory interface 4 and which, as necessary, reads out data from the third buffer 15 and outputs it from the first output terminal 17.

Similarly, as shown in FIG. 1, the memory control circuit 2 includes a fourth buffer 19 for temporarily storing data transferred from the SDRAM 1, a fourth counter 20 for counting number of pieces of data stored in the fourth buffer 19, and a second output terminal 21 for output of data and control signals. The memory control circuit 2 also includes a fourth data transfer circuit 22, when the bus arbiter 6 grants execution of data transfer using the internal memory bus 5, which writes data into the fourth buffer 19 via the memory interface 4 from the SDRAM 1 and which, as necessary, reads out data from the fourth buffer 19 and outputs it from the second output terminal 21. Most generally, the first to fourth buffers 7, 11, 15 and 19 for temporarily storing data to be transferred form or to the SDRAM 1 are FIFO (First-In First-Out) buffers. However, they are not limited to the FIFO buffers, and they may be other types of buffers such as LIFO (Last-In First-Out) buffers or completely random access buffers.

Furthermore, as shown in FIG. 1, the memory control circuit 2 includes an SDRAM initializing-command generation circuit 23, when the bus arbiter 6 grants the access to the internal memory bus 5, which issues a series of initializing commands to the SDRAM 1 to initialize the internal state of the SDRAM 1, and a refresh-command generation circuit 24, when the bus arbiter 6 grants the access to the internal memory bus 5, which issues a refresh command to the SDRAM 1.

The operation of the memory control circuit 2 in accordance with the first embodiment shown in FIG. 1 will be described. In the first embodiment, data received from the first and second input terminals 9 and 13 are, for example, video data. Control signals received from the first and second input terminals 9 and 13 are, for example, a data enable signal indicative of effective data and a vertical synchronization signal. The data enable signal is a signal indicating that the input data is effective data to be transferred to the SDRAM1. When the data enable signal is in its enable state, the data received from the first and second input terminals 9 and 13 are written into the first and second buffers 7 and 11 by the first and second data transfer circuits 10 and 14 respectively.

Similarly, in the first embodiment, data outputted from the first and second output terminals 17 and 21 are, for example, video data. Control signals outputted from the first and second output terminals 17 and 21 are, for example, a data enable signal and a vertical synchronization signal generated in the interior of the third and fourth data transfer circuits 18 and 22. The data enable signal outputted from the first and second output terminals 17 and 21 indicates that the output data is effective data transferred from the SDRAM 1. When the data enable signal is in its enable state, data stored in the third and fourth buffers 15 and 19 are read out by the third and fourth data transfer circuits 18 and 22 and then outputted from the first and second output terminals 17 and 21.

The first counter 8 adds "1" to its count value each time the first data transfer circuit 10 writes a piece of data into the first buffer 7, and decrements its count value by "1" each time a piece of data is read out from the first buffer 7. When the count value of the first counter 8 becomes "32" or more, the first data transfer circuit 10 transmits a first request signal to the bus arbiter 6 to ask the bus arbiter 6 to start data transfer via the internal and external memory buses 5 and 3. The condition that the first counter 8 decrements its count value by "1" may be each time a write command is issued to the SDRAM 1.

Further, when detecting a reference edge in the vertical synchronization signal received from the first input terminal 9, the first data transfer circuit 10 erases all the data stored in the first buffer 7 and resets the count value of the first counter 8 to "0". The resetting of the states of the first buffer 7 and the first counter 8 for each one vertical duration is a measure taken for enabling return to the normal state in the next vertical duration, e.g., even when a malfunction such as overflow took place in the first buffer 7. When it is ensured that such malfunction will not occur, such a measure becomes unnecessary. When the first data transfer circuit 10 detects a reference edge in the vertical synchronization signal during data transfer, the first data transfer circuit 10 immediately interrupts the data transfer now being executed or erases the data stored in the first buffer 7 after completion of the data transfer in execution, in order to prevent the first data transfer circuit 10 from transferring ineffective data from the first buffer 7 that is empty to the SDRAM 1.

In a similar manner to the first counter 8, the second counter 12 also counts number of pieces of data stored in the second buffer 11, and when the count value of the second counter 12 becomes "32" or more, the second data transfer circuit 14 transmits a second request signal to the bus arbiter 6.

Meanwhile, each time the third data transfer circuit 18 issues a read command to the SDRAM 1, the third counter 16 decrements its count value by "1". Each time one piece of data is read out from the third buffer 15, the third counter 16 adds "1" to its count value. When the count value of the third counter 16 reaches "32" or more, the third data transfer circuit 18 transmits to the bus arbiter 6 a third request signal to ask the bus arbiter 6 to start the data transfer via the internal memory bus 5 and the external memory bus 3. The condition that the third counter 16 decrements its count value by "1" may be each time one piece of data is written into the third buffer 15.

At this stage, the third counter 16 counts a value corresponding to a subtraction of the number of pieces of data stored in the third buffer 15 from the whole data capacity of the third buffer 15. However, since this value corresponds to the number of pieces of data stored in the third buffer 15 in a one-to-one relationship, the third counter 16 is regarded substantially as counting the number of pieces of data stored in the third buffer 15. Of course, a counting method similar to in the first counter 8 may be employed. In this case, it is required that the count value corresponding to the output of the third request signal be changed to a value corresponding to a subtraction of "32" from the whole data capacity of the third buffer 15.

When detecting a reference edge in the vertical synchronization signal generated in the interior of the third data transfer circuit 18, the data transfer circuit 18 erases all the data stored in the third buffer 15 and also sets the count value of the third counter 16 to be equal to the whole data capacity of the third buffer 15. This is for the purpose of enabling return to the normal state in the next vertical duration, e.g., even when a malfunction such as underflow took place in the third buffer 15. In this connection, when the third data transfer circuit 18 detected a reference edge in the vertical synchronization signal during the data transfer, data to be normally displayed in a different vertical duration may be erroneously displayed in the same vertical duration. For the purpose of avoiding such a situation, the third data transfer circuit 18 is arranged to immediately interrupt the executing data transfer and inhibits the write operation to the third buffer 15 until a predetermined time duration elapses, or to erase the data stored in the third buffer 15 after completion of the data transfer in execution and the predetermined duration elapses. In any case, the third data transfer circuit 18 waits for the lapse of the predetermined duration. This is because there is generally present a constant latency time after issuance of a read command to the SDRAM 1 until the data is actually written into the third buffer 15, and because, even after the data transfer is interrupted or completed, the data may be written into the third buffer 15.

In a similar manner to the third counter 16, the fourth counter 20 also counts the number of pieces of data stored in the fourth buffer 19 and, when the count value of the fourth counter 20 becomes "32" or more, the fourth data transfer circuit 22 transmits a fourth request signal to the bus arbiter 6.

The memory interface 4 is provided to perform mutual conversion between the format of commands and addresses used for the internal memory bus 5 and the format of commands and addresses used for the external memory bus 3. When such conversion is unnecessary, the memory interface 4 becomes unnecessary and thus it become unnecessary to draw a clear distinction between the internal and external memory buses 5 and 3. Even when the format of addresses and commands is different between the internal and external memory buses 5 and 3, the buses have substantially the same function. Thus this means that the arbitration of the internal memory bus 5 is equivalent to the arbitration of the external memory bus 3 directly connected to the SDRAM 1.

Figure 2:
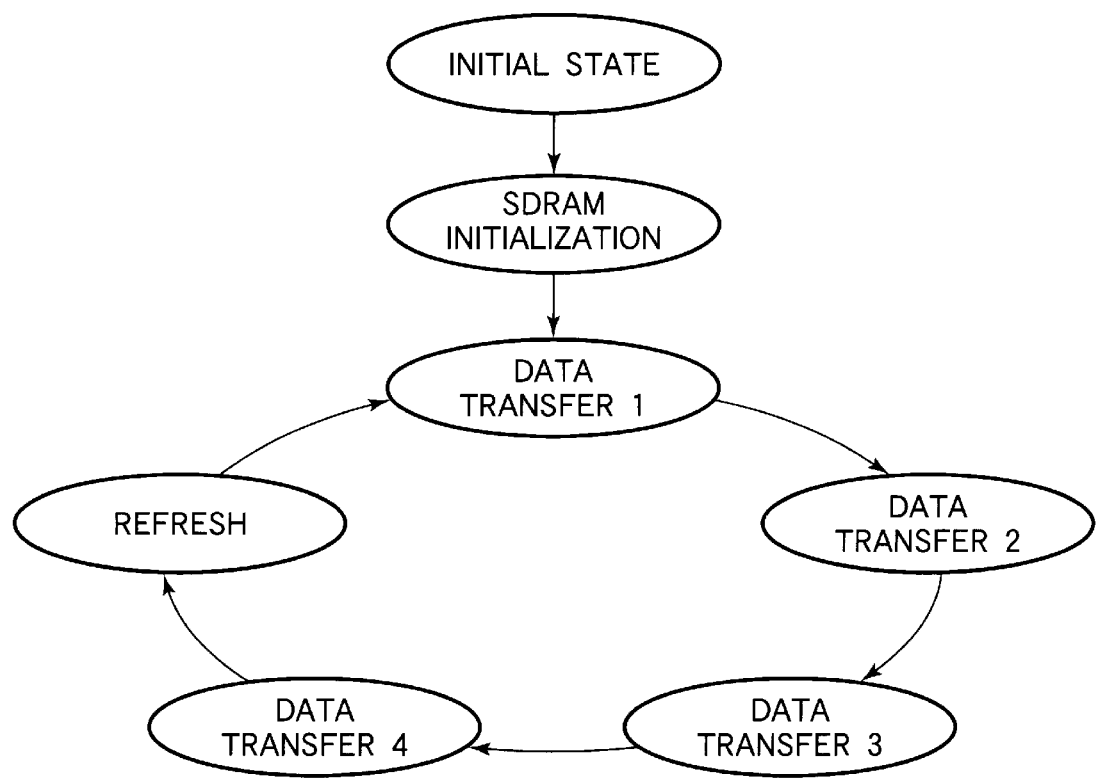
FIG. 2 is a diagram showing a state transition of a state machine incorporated in a bus arbiter used in the first embodiment.

The bus arbiter 6 incorporates a state machine. A state transition diagram of the state machine is shown in FIG. 2. The state of the state machine when the memory control circuit 2 started its operation is an "initial state", as shown in FIG. 2.

Since a general SDRAM device is required to initialize its internal state prior to execution of data transfer, the state machine built in the bus arbiter 6 shifts its current state to an "SDRAM initialization" state (that is to say, transition of the current state of the state machine to a renewed current state takes place) at a suitable timing in order to grant the SDRAM initializing-command generation circuit 23 the access to the internal memory bus 5. In response to it, the SDRAM initializing-command generation circuit 23 generates a series of initializing commands and the initialization of the SDRAM is completed at a suitable timing, the SDRAM initializing-command generation circuit 23 informs the bus arbiter 6 of the fact that the initialization has been finished. The timing of starting the SDRAM initialization may be set to be externally given or the transition of the current state to the "SDRAM initialization" state automatically takes place after the "initial state" was kept for a constant time.

When the SDRAM initializing-command generation circuit 23 informs the bus arbiter 6 of the completion of the initialization, the state machine shifts its current state to a "data transfer 1" state. At this time, if the first data transfer circuit 10 is transmitting the first request signal, then the bus arbiter 6 transmits the first acknowledge signal to the first data transfer circuit 10. Conversely, when the first data transfer circuit 10 does not transmit the first request signal, the state machine immediately shifts its current state to a "data transfer 2" state as a renewed current state. When the bus arbiter 6 outputs the first acknowledge signal to the first data transfer circuit 10 and when the termination of the data transfer is informed from the first data transfer circuit 10, the state machine shifts its current state to a "data transfer 2" state as a renewed current state.

Further, when the state machine shifts its current state to the "data transfer 2" state and when the second data transfer circuit 14 is transmitting the second request signal, the bus arbiter 6 transmits the second acknowledge signal to the second data transfer circuit 14. At this time, if the second data transfer circuit 14 is not transmitting the second request signal, then the state machine immediately shifts its current state to a "data transfer 3" state as a renewed current state. When the bus arbiter 6 outputs the second acknowledge signal to the second data transfer circuit 14 and when the termination of the data transfer is informed from the second data transfer circuit 14, the state machine shifts its current state to the "data transfer 3" state as a renewed current state.

In the similar manner to the above, the "data transfer 3" state is made to be associated with the third data transfer circuit 18 and the "data transfer 4" state is made to be associated with the fourth data transfer circuit 22. Therefore, when the third data transfer circuit 18 transmits the third request signal at the time of the transition to the "data transfer 3" state, the bus arbiter 6 transmits, in response to the third request signal, the third acknowledge signal to the third data transfer circuit 18. Further, when the fourth data transfer circuit 22 transmits the fourth request signal at the time of the transition to the "data transfer 4" state, the bus arbiter 6 transmits, in response to the third request signal, the third acknowledge signal to the fourth data transfer circuit 22.

A state next to the "data transfer 4" state is a "refresh" state. When the state machine shifts its current state to the "refresh" state, the bus arbiter 6 automatically transmits the fifth acknowledge signal to the refresh command generation circuit 24 to enable the access to the internal memory bus 5. Thereafter, when the termination of the refresh operation is informed from the refresh command generation circuit 24 to the bus arbiter 6, the state machine returns its current state to the "data transfer 1" state (that is to say, transition of the current state to the "data transfer 1" state takes place). After this, the data transfer and refresh operations are cyclically carried out according to the aforementioned state transitions.

Meanwhile, when the first data transfer circuit 10 receives the first acknowledge signal from the bus arbiter 6, the first data transfer circuit 10 transmits thirty-two pieces of data to the SDRAM 1 from the first buffer 7 via the memory interface 4, and informs the bus arbiter 6 of the termination of the data transfer at a suitable timing. Similarly, when the second data transfer circuit 14 receives the second acknowledge signal, the circuit 14 transmits thirty-two pieces of data from the second buffer 11 via the memory interface 4 to the SDRAM 1, and informs the bus arbiter 6 of the termination of the data transfer at a suitable timing.

When the third data transfer circuit 18 receives the third acknowledge signal from the bus arbiter 6, the third data transfer circuit 18 writes thirty-two pieces of data into the third buffer 15 from the SDRAM 1 via the memory interface 4, and informs the bus arbiter 6 of the termination of the data transfer at a suitable timing. Similarly, when the fourth data transfer circuit 22 receives the fourth acknowledge signal from the bus arbiter 6, the fourth data transfer circuit 22 writes thirty-two pieces of data into the fourth buffer 19 from the SDRAM 1 via the memory interface 4 and informs the bus arbiter 6 of the termination of the data transfer at a suitable timing.

In the first embodiment, when the data transfer occurs, each data transfer circuit generates addresses and commands necessary for the data transfer and at the same time, and transmits them to the SDRAM 1 via the internal and external memory buses 5 and 3. Only one of the data transfer circuits can exist which transmits addresses and commands to the internal memory bus 5. Therefore, the memory control circuit 2 maybe constructed in such a way that each of the data transfer circuits 10, 14, 18 and 22 does not generate addresses and commands and the memory control circuit 2 includes only one data transfer circuit (not shown in FIG. 1) for generating addresses and commands necessary for the data transfer.

When the refresh command generation circuit 24 receives the fifth acknowledge signal from the bus arbiter 6, the refresh command generation circuit 24 generates a refresh command twice and informs the bus arbiter 6 of the termination of the refresh operation at a suitable timing. In the refresh operation, only the command is transmitted to the internal and external memory buses 5 and 3, and the addresses and data are usually not transmitted.

Figure 3:
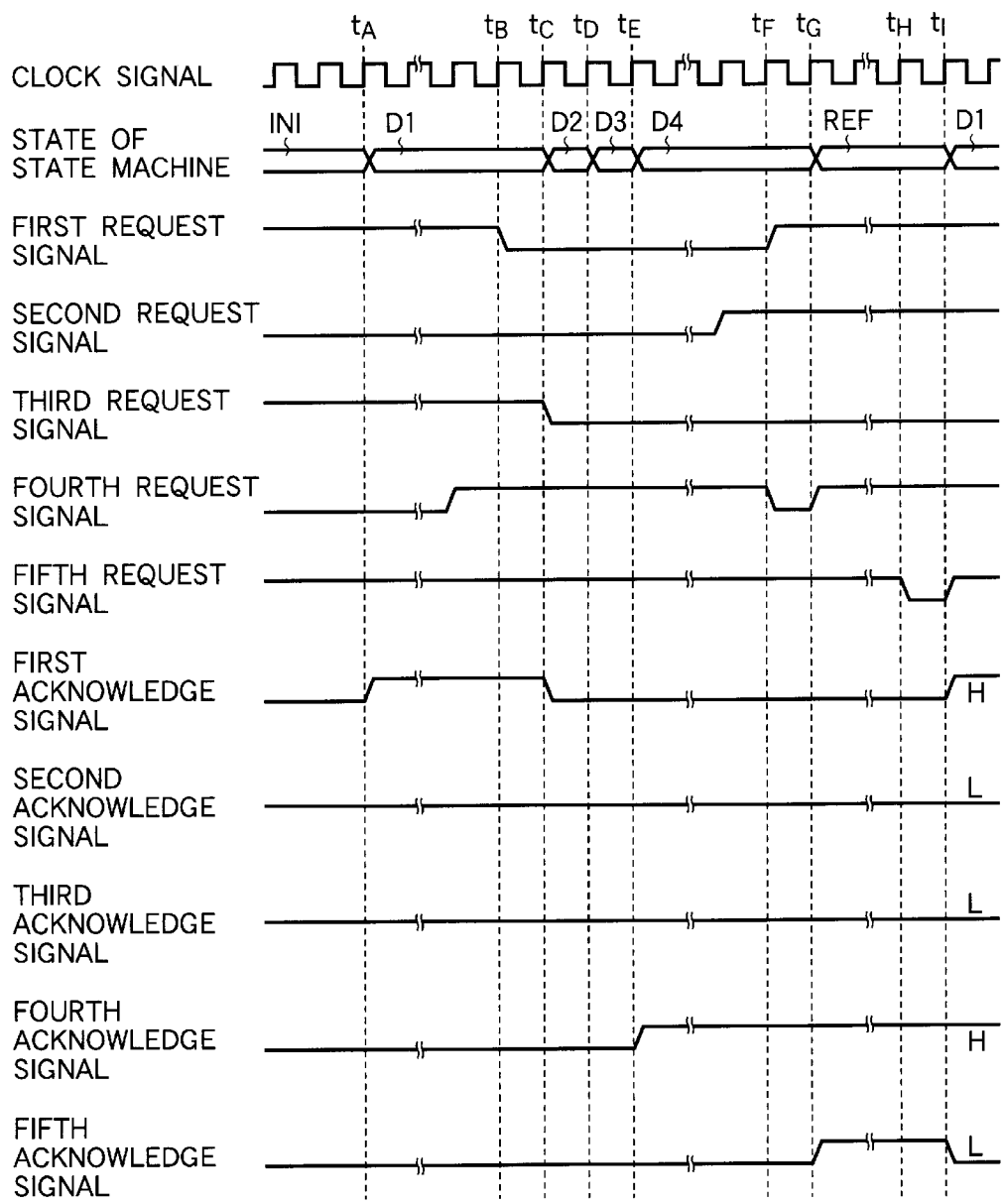
FIG. 3 is a timing chart for explaining operation of the bus arbiter used in the first embodiment.

FIG. 3 is a timing chart for explaining how the bus arbiter 6 arbitrates the internal memory bus 5 using the request signals and the acknowledge signals. FIG. 3 shows waveforms of a clock signal for driving the state machine, states of the state machine incorporated in the bus arbiter 6, and waveforms of five types of request signals and five types of acknowledge signals. In the first embodiment, the state of the state machine, the five types of request signals, and the five types of acknowledge signals vary always in synchronization with a rising edge in the clock signal. The fifth request signal is a signal which the refresh command generation circuit 24 transmits to the bus arbiter 6. In FIG. 3, the request signals and the acknowledge signals are all high active. Further, in FIG. 3, in connection with the states of the state machine, the "SDRAM initialization" state is abbreviated to "INI", the "data transfer 1" state is abbreviated to "D1", the "data transfer 2" state is abbreviated to "D2", the "data transfer 3" state is abbreviated to "D3", the "data transfer 4" state is abbreviated to "D4", and the "refresh" state is abbreviated to "REF".

In FIG. 3, the state machine incorporated in the bus arbiter 6 shifts its current state from the "SDRAM initialization" state to the "data transfer 1" state at a timing $t_A$. Since the first request signal is at high level at the timing $t_A$, the bus arbiter 6 sets the first acknowledge signal to its high level (H) and grants start of the data transfer to the first data transfer circuit 10. Thereafter, since the first data transfer circuit 10 changes the first request signal to its low level (L) at a timing $t_B$ to indicate the termination of transfer of the thirty-two pieces of data to the SDRAM 1. In this way, signals indicative of the start request, execution and termination of the data transfer are multiplexed into the request signal for simplification of the drawing in the first embodiment. However, the present invention is not limited to the specific example but it is possible that the request signal indicates only the start request of the data transfer and that the data transfer in execution and the termination of the data transfer are indicated respectively by provision of two types of signals.

When the bus arbiter 6 detects the low level of the first request signal at a timing $t_C$, the bus arbiter 6 sets the first acknowledge signal to low level and the state machine shifts its current state to the "data transfer 2" state. Since the first acknowledge signal is a signal for granting the start of the data transfer, it is not necessarily required to set the first acknowledge signal to the low level always at the timing $t_C$ and it is possible to set the level of the signal to the low level at a suitable timing. When the first counter 8 has a count value less than "32" at the timing $t_C$, the first request signal remains at the low level as shown in FIG. 3. Since the second request signal is at its low level at the timing $t_C$, the second acknowledge signal remains at its low level and the state machine immediately shifts its current state to the "data transfer 3" state at a next timing $t_D$. In this connection, the third data transfer circuit 18, which is not used to perform the data transfer, acts to set the third request signal to low level at the timing $t_C$. This is because a reference edge in the vertical synchronization signal is detected and the count value of the third counter 16 is reset to zero according to the aforementioned operation.

Since the third request signal is at low level at the timing $t_D$, the third acknowledge signal remains at low level and the state machine immediately shifts its state to the "data transfer 4" state at a next timing $t_E$.

At the timing $t_E$, since the fourth request signal is at high level, the fourth acknowledge signal is changed to high level. Responsive to the fourth acknowledge signal, the fourth data transfer circuit 22 starts the data transfer. Thereafter, the fourth data transfer circuit 22 changes the fourth request signal to low level at the timing $t_F$ in order to indicate the termination of transfer of the thirty-two pieces of data from the SDRAM 1.

When detecting the low level of the fourth request signal at a timing $t_G$, the bus arbiter 6 sets the fourth acknowledge signal to low level and the state machine shifts its current state to the "refresh" state. When the count value of the fourth counter 20 is "32" or more at the timing $t_G$, the fourth request signal immediately changes to high level at the timing $t_G$, as shown in FIG. 3. In the "refresh" state, the bus arbiter 6 changes the fifth acknowledge signal to high level regardless of the level of the fifth request signal and orders the refresh command generation circuit 24 to start its refresh operation. Thereafter, the refresh command generation circuit 24 changes the fifth request signal to low level in order to indicate the end of the two refresh operations at a timing $t_H$. In the "refresh" state, since the access to the internal memory bus 5 is granted always to the refresh command generation circuit 24, the fifth request signal substantially indicates only the end of the refresh operation. For this reason, the fifth request signal is returned to high level at a next timing $t_I$.

When the bus arbiter 6 detects the low level of the fifth request signal at the timing $t_I$, the bus arbiter 6 sets the fifth acknowledge signal to low level and the state machine shifts its current state to the "data transfer 1" state. Since the first request signal is at high level at the timing $t_I$, the bus arbiter 6 sets the first acknowledge signal to high level, thereby making the first data transfer circuit 10 to start the data transfer.

In the same manner as in the above, in response to the five types of request signals, the five types of acknowledge signals vary in their level and the state machine shifts its current state to a renewed current state (that is to say, transition of the current state of the state machine takes place) correspondingly.

With the memory control circuit 2 arranged as mentioned above, even when the data enable signal received or issued from the respective input and output terminals becomes an enable state at a given timing, data can be transmitted in synchronism with the data enable signal between the memory control circuit 2 and an external circuit, which will be explained below.

For example, any of the data transfer circuits requires a time corresponding to 38 clock cycles until the data transfer circuit receives the acknowledge signal and thereafter informs the bus arbiter 6 of the completion of its transfer of the thirty-two pieces of data. Further, the refresh command generation circuit 24 requires a time corresponding to 8 clock cycles until the circuit receives the fifth acknowledge signal and then informs the bus arbiter 6 of completion of generation of the refresh command twice, for example. In this case, 1 clock cycle is based on the period of a clock for driving the SDRAM 1 as a reference. The SDRAM 1 can write or read one piece of data per one clock cycle.

One piece of data per 5 clock cycles is inputted to the first and second input terminals 9 and 13 together with the data enable signal in an effective display duration and one piece of data per 5 clock cycles is outputted from the first and second output terminals 17 and 21 in the effective display duration. The data received from the first and second input terminals 9 and 13 are written into the first and second buffers 7 and 11 respectively. Further, the data issued from the first and second output terminals 17 and 21 are data read out from the first and second buffers 7 and 11 respectively.

In this case, data capable of being transferred between the memory control circuit 2 and the SDRAM 1 is a maximum of "128" (=(160 clock cycles−8 clock cycles)×(32/(38 clock cycles))) pieces of data per 160 clock cycles, and data capable of being transferred to an external circuit via the memory control circuit 2 and respective input and output terminals correspond to "128" pieces of data per 160 clock cycles. Thus it will be appreciated that the number of pieces of data capable of being transferred between the memory control circuit 2 and external circuit per unit time is equal to a maximum of pieces of data capable of being transferred between the memory control circuit 2 and the SDRAM 1.

Attention is directed to the first buffer 7 for example, the number of pieces of data stored in the first buffer 7 will not increase endlessly at least with time. Therefore, when the whole data capacity of the first buffer 7 has a certain level of size, the first data transfer circuit 10 can write all the data received from the first input terminal 9 into the SDRAM 1 without causing the buffer 7 to overflow. This holds true even for the second buffer 11.

Further, with respect to even the third buffer 15, the number of pieces of data stored in the third buffer 15 will not decrease endlessly at least with time. Accordingly, when a considerable number of pieces of data are stored in the third buffer 15 immediately before the effective display duration, the third data transfer circuit 18 can read out from the SDRAM 1 the data to be outputted from the first output terminal 17, while avoiding the underflow of the third buffer 15. This holds true even for the fourth buffer 19.

Now it will be explained that the whole data capacity of the buffers can be finite, by referring to a specific example. If the first counter 8 has a count value of "32" or more at the time point that the state machine shifts its current state to the "data transfer 1" state, then the bus arbiter 6 responsive to the first request signal transmits the first acknowledge signal to the first data transfer circuit 10, thus resulting in that the first data transfer circuit 10 transmits thirty-two pieces of data to the SDRAM 1 over a time corresponding to 38 clock cycles.

If the first data transfer circuit 10 completed the data transfer and thereafter any of the second, third and fourth data transfer circuits 14, 18 and 22 performed the data transfer, a time corresponding to 160 clock cycles becomes necessary before the state machine shifts its current state through one round of state transitions and returns to the "data transfer 1" state. During the transitions of the current state, the number of pieces of data written into the first buffer 7 via the first input terminal 9 is "32". Thus the first counter 8 has a count value of "32" or more immediately before the state machine shifts its current state to the "data transfer 1" state and the first data transfer circuit 10 responding to the first acknowledge signal again executes the data transfer.

Likewise, with respect to even the second, third and fourth counters 12, 16 and 20, the count value increases by "32" during a time of 160 clock cycles and decreases by "32" with the data transfer. Accordingly during one complete round of the state transitions of the state machine, the count value of each counter will return to the same value. If all the data transfer circuits executes the data transfer during one round of the state transitions of the state machine at a time point, then all the data transfer circuits will thereafter execute the data transfer always once during the one complete round of the state transitions of the state machine. When the data transfer circuit does not perform the data transfer, the count value of the counter increases with time. Thus when a certain length of time has elapsed, the count value of each counter becomes always "32" or more, with the result that, during the complete round of the state transitions of the state machine, each data transfer circuit will perform the data transfer always only once. In this way, by setting the whole data capacity of the buffers to a certain value, the data transfer can be executed while preventing the overflow and underflow of the buffers.

Consider now a case where data is transferred to an external circuit via the each input/output terminal at a timing different from the above timing. That is, it is assumed that three pieces of data per 10 clock cycles are written into the first buffer 7, one piece of data per 16 clock cycles is written into the second buffer 11, three pieces of data per 10 clock cycles are read out from the third buffer 15, and one piece of data per 16 clock cycles is read out from the fourth buffer 19.

At this time, the number of data to be transferred between the memory control circuit 2 and external circuit is "116" (=(160 clock cycles)×(3/(10 clock cycles)+1/(16 clock cycles)+3/(10 clock cycles)+1/(16 clock cycles))) per 160 clock cycles. Therefore, it will be appreciated that the data piece number is smaller than a maximum number "128" of pieces of data capable of being transferred to the SDRAM 1 during the same duration. Even in this case, accordingly, by using the buffers having the whole data capacity of an enough large amount, the data transfer can be carried out without causing generation of overflow or underflow. This will be explained with reference to FIG. 4.

FIG. 4 shows elapsed times until the state machine shifts its current state, the count values of the four counters, and the levels of the five types of acknowledge signals. In this connection, the elapsed time uses 1 clock cycle as its unit. In FIG. 4, the elapsed time is set to "0" when the count values of the counters become all "32" and when the state machine shifts its current state to the "data transfer 1" state.

When the count value of the first counter 8 is "32" immediately before the state machine shifts its current state to the "data transfer 1" state, the bus arbiter 6 responsive to the first request signal changes the first acknowledge signal to high level, whereby the first data transfer circuit 10 transmits thirty-two pieces of data from the first buffer 7 to the SDRAM 1 in a time of 28 clock cycles. When data is written into the first buffer 7 at intervals of 3, 6 and 10 clock cycles after the transition of the current state to the "data transfer 1" state, the count value of the first counter becomes 11 immediately before the state transition to the "data transfer 1" state. Similarly, when data is written into the second buffer 11 after 16 clock cycles followed by the transition of the current state to the "data transfer 1" state, the clock cycle of the second counter becomes 34 immediately before the state transition to the "data transfer 2" state. The same holds true even for the third and fourth counters 16 and 20. That is, their count values become 43 and 34 respectively immediately before the transition of the current state to the "data transfer 2" state.

When the state machine has shifted its current state through four rounds and reached the "data transfer 1" state in this way, 418 clock cycles has already elapsed so that the count values of the first, second, third and fourth counters 8, 12, 16 and 20 become 29, 26, 29 and 26 respectively, which are all smaller than those at the time of the elapsed time of "0", as shown in FIG. 4. Accordingly even in this case, the bus arbiter 6 can suitably control timing of the data transfer carried out by the respective data transfer circuits without causing the respective buffers to overflow or underflow.

Referring now to the states of the five types of acknowledge signals shown in FIG. 4, the frequency of data transfer carried out during 4 rounds of the state transition of the state machine is "4" for the first and third data transfer circuits 10 and 18 and "1" for the second and fourth data transfer circuits 14 and 22. That is, it will be appreciated that, when the number of pieces of data inputted or outputted per unit time from each input or output terminal is "1" for 5 clock cycles, each data transfer circuit is executed always once during a complete one round of the state transition of the state machine; whereas, when the number of pieces of data inputted per unit time from each input terminal is different from that from each output terminal, the data transfer circuit, to/from which the larger number of pieces of data per unit time is inputted/outputted from the input/output terminals, means that the circuit is allowed to be frequently data transferred by the bus arbiter 6.

In this way, the bus arbiter 6 can give an opportunity of more data transfer to the data transfer circuit which requires more data transfer. The frequency of data transfer to one data transfer circuit is automatically adjusted according to the amount of data per unit time inputted/outputted from the input/output terminals. So long as the number of pieces of data transferred to the external circuit per unit time does not exceed the maximum number of pieces of data capable of being transferred to the SDRAM 1, timing of the data inputted/outputted to/from the external circuit may be arbitrary. Further, the input/output timing is not required to be always cyclically as in the above two cases but the number of pieces of data inputted/outputted per unit time may be changed with time. Furthermore, even when the number of pieces of data transferred with the external circuit per unit time instantaneously exceeds the maximum number of pieces of data capable of being transferred to the SDRAM 1, the data transfer can be realized by setting the whole data capacity of the buffers to a certain large value without causing each buffer to overflow or underflow, so long as the number of pieces of data transferred to the external circuit when averaged in a certain length of time does not exceed the maximum number.

Although the count values at which the data transfer circuits transmit the request signals have been set especially to all the same as "32" in the first embodiment, the set count values are not limited to "32" but may be set to different values for the respective data transfer circuits. In the first embodiment, the number of pieces of data to be transferred by each data transfer circuit at a time has been set especially to be all the same as "32". However, the data number is not limited to "32" but may be set to different values for the respective data transfer circuits as necessary.

Furthermore, the first embodiment has been arranged, when transition of the current state of the state machine takes place, to detect the level the request signal and determine whether or not to transmit the acknowledge signal. However, timing of detecting the level of the request signal may be shifted one or several clocks therefrom.

Second Embodiment

A memory control circuit according to the second embodiment is the same as the memory control circuit according to the first embodiment except for a method for counting numbers of pieces of data stored in the respective buffers. Therefore, only parts of the second embodiment different from the first embodiment will be described.

In the first embodiment, the timing when the data is written into the first buffer 7 has been set in accordance with the period of the clock for driving the SDRAM 1, for example, once per 5 clock cycles. In such a case, however, the frequency of the clock for use to write data into the first buffer 7 is set to be ⅕ of the frequency of the clock for driving the SDRAM 1 in an actual circuit. This is because the power consumption of the circuit becomes less advantageously.

At this time, when the frequency of the clock for reading data from the first buffer 7 is set to be the same as that for driving the SDRAM 1, the clock used for the write operation of the first buffer 7 is different from the clock used for the read operation, so that the synchronization circuit cannot count the number of pieces of data stored in the first buffer 7 under this condition.

Figure 5:
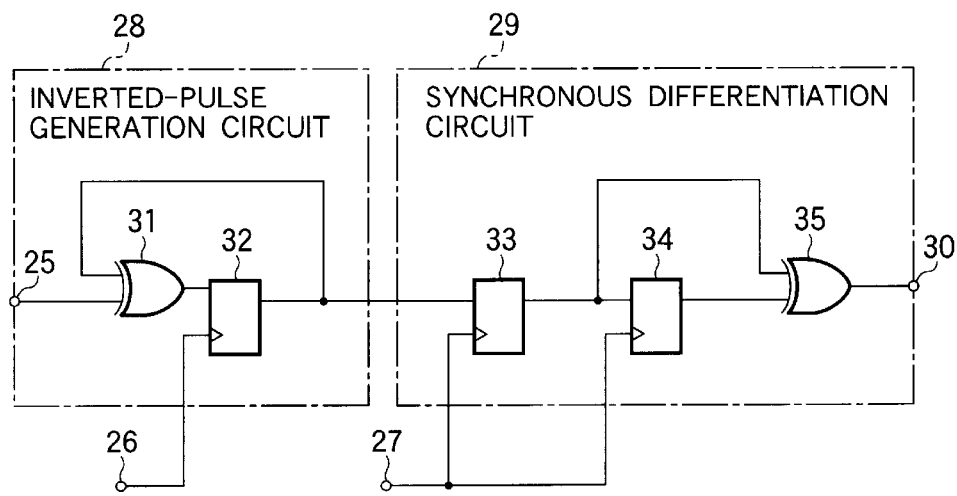
FIG. 5 is a diagram showing structures of an inverted pulse generation circuit and a synchronous differentiation circuit in a second embodiment of the present invention.

To avoid this, such a circuit as shown in FIG. 5 is incorporated in the first data transfer circuit 10 in the second embodiment.

As shown in FIG. 5, the first data transfer circuit 10 includes a data enable signal input terminal 25 for receiving a data enable signal indicating that data received from the first input terminal 9 is effective data to be written into the first buffer 7, a write clock input terminal 26 for receiving a write clock used for the write operation of the first buffer 7, and a read clock input terminal 27 for receiving a read clock used for the read operation of the first buffer 7. The first data transfer circuit 10 also includes an inverted-pulse generation circuit 28 for generating an inverted pulse each time the data enable signal is changed to its enable state, a synchronous differentiation circuit 29 for detecting an edge in the inverted pulse generated by the inverted-pulse generation circuit 28, and a data enable signal output terminal 30 for supplying an output of the synchronous differentiation circuit 29 to the first counter 8.

The inverted-pulse generation circuit 28 incorporates a first XOR gate 31 for outputting a logical exclusive OR (XOR) and a first D-flip-flop 32 for outputting an output of the first XOR gate 31 in synchronism with the write clock.

The synchronous differentiation circuit 29 incorporates a second D-flip-flop 33 for synchronizing an output of the first D-flip-flop 32 with the read clock, a third D-flip-flop 34 for delaying an output of the second D-flip-flop 33 by a duration corresponding to one period of the read clock, and a second XOR gate 35 for outputting the output of the second D-flip-flop 33 and a logical exclusive OR as an output of the third D-flip-flop 34 to the data enable signal output terminal 30.

In the second embodiment, a data enable signal received from the data enable signal input terminal 25 has the same waveform as the data enable signal received from the first input terminal 9 and the data enable signal is a high active signal. That is, when the data enable signal received from the first input terminal 9 is at its high level, the data received from the first input terminal 9 is written into the first buffer 7.

Additionally, in the second embodiment, the data and the data enable signal received from the first input terminal 9 are synchronous with the write clock used for the write operation of the first buffer 7, the read clock used for the read operation of the first buffer 7 is the same signal as the clock for driving the SDRAM 1 as mentioned above, and the clock has a frequency 2.5 times higher than the frequency of the write clock.

The first counter 8 increments its count value by "1" each time the data enable signal outputted from the data enable signal output terminal 30 is changed to high level and decrements its count value by "1" each time a write command is issued to the SDRAM 1. As a result, the number of pieces of data stored in the first buffer 7 can be counted with use of only the read clock, which will be explained with reference to FIG. 6.

Figure 6:
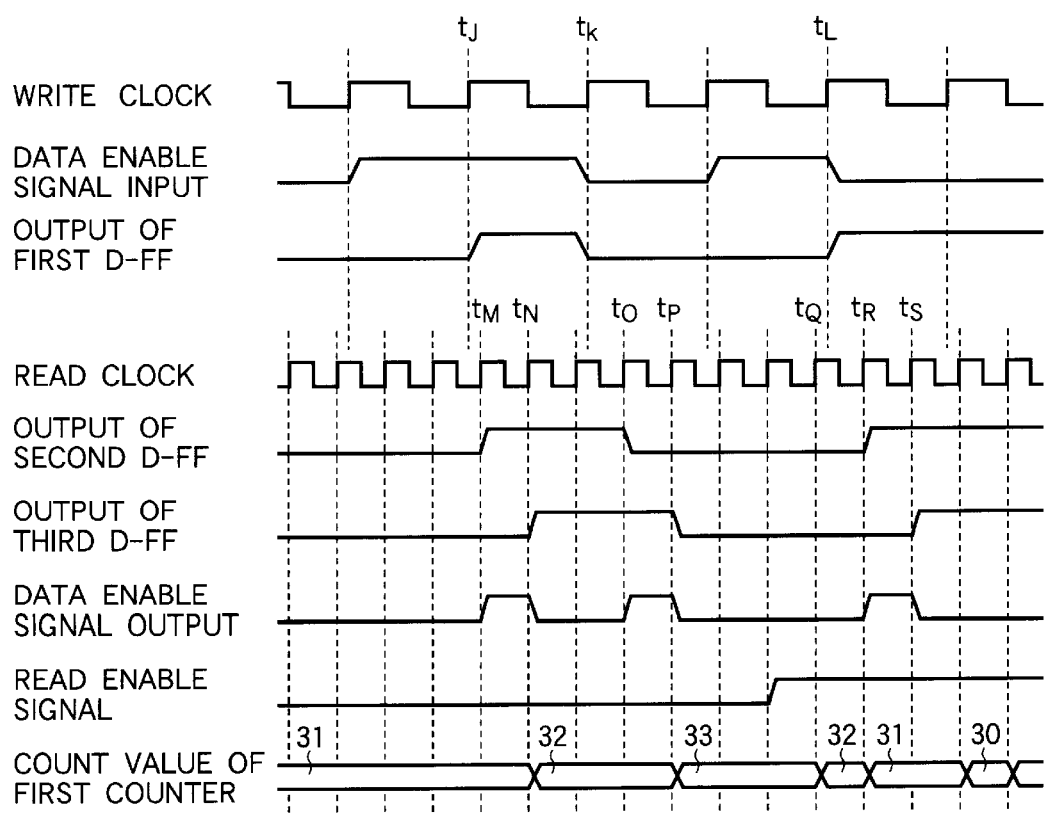
FIG. 6 is a timing chart for explaining the operation of the inverted-pulse generation circuit and the synchronous differentiation circuit in the second embodiment.

FIG. 6 shows the read and write clocks, the data enable signal received from the data enable signal input terminal 25, the output signal of the second D-flip-flop 33, the output signal of the third D-flip-flop 34, the data enable signal outputted from the data enable signal output terminal 30, the read enable signal indicative of reading of data from the first buffer 7 each time it is changed to high level, and the count value of the first counter 8. In FIG. 6, the data enable signal received from the data enable signal input terminal 25 is abbreviated to "data enable signal input", the data enable signal outputted from the data enable signal output terminal 30 is abbreviated to "data enable signal output", and the D-flip-flop is abbreviated to "D-FF".

As shown in FIG. 6, the data enable signal received from the data enable signal input terminal 25 is at high level at timings $t_J$, $t_K$ and $t_L$. Then since the output of the first XOR gate 31 is operated to inverse the output of the first D-flip-flop 32, the level of the output of the first D-flip-flop 32 is inverted at the timings $t_J$, $t_K$ and $t_L$.

The second D-flip-flop 33 is operated to synchronize the output of the first D-flip-flop 32 synchronous with the write clock with the read clock, whereby the output level is inverted at the timings $t_M$, $t_O$ and $t_R$ at which the read clock rises immediately after timing $t_J$, $t_K$ and $t_L$. Since the output of the third D-flip-flop 34 corresponds to a delay of the output of the second D-flip-flop 33 by one period, the level is inverted at the timings $t_N$, $t_P$, and $t_S$. And since the data enable signal outputted from the data enable signal output terminal 30 corresponds to a logical exclusive OR of the output of the second D-flip-flop 33 and the output of the third D-flip-flop 34, the level becomes high level at the timings $t_N$, $t_P$ and $t_S$.

The first counter 8 increments its count value by "1" each time the data enable signal outputted from the data enable signal output terminal 30 is changed to high level, and decrements the count value by "1" each time the read enable signal is changed to high level. Accordingly, if the read enable signal is always at high level at rising edges in the read clock after the timing $t_Q$, the counter increments its count value by "1" at the timing $t_N$ and $t_P$, and decrements the count value by "1" each time the read clock rises at the timing $t_Q$ and thereafter except for the timing $t_S$. At the timing $t_S$, since the data enable signal outputted from the data enable signal output terminal 30 and the read enable signal are both at high level, the count value of the counter does not increment nor decrement.

It will be seen from FIG. 6 that the data enable signal kept at high level only during a time of 3 periods of the write clock at the data enable signal input terminal 25 is also kept at high level only during a time of 3 periods of the read clock, so that the data enable signal can be synchronized with the clock signal of a different frequency therefrom with use of the circuit shown in FIG. 5. In this manner, the power consumption of the entire circuit can be suppressed by driving only part of the memory control circuit 2 with the clock having a high frequency while driving the clock having a low frequency.

The second embodiment has been explained in connection with the case where the read clock has a frequency corresponding to 2.5 times the frequency of the read clock. However, any frequency can be employed and the frequencies of the read and write clocks can be changed with time, so long as the frequency of the read clock is higher than that of the write clock Further, though the above explanation has been made as to the first data transfer circuit 10 which transfer data from the first buffer 7 to the SDRAM 1 in the second embodiment, a similar circuit can be incorporated even in the third and fourth data transfer circuits 18 and 22 for data transfer from the SDRAM 1 to the buffer to thereby count the number of pieces of data stored in the buffer. In the case of the third and fourth data transfer circuits 18 and 22, a relationship between the read and write clocks is reversed to that in the first data transfer circuit 10.

Third Embodiment

A memory control circuit according to the third embodiment has a structure different from that of the memory control circuit according to the first embodiment.

Figure 7:
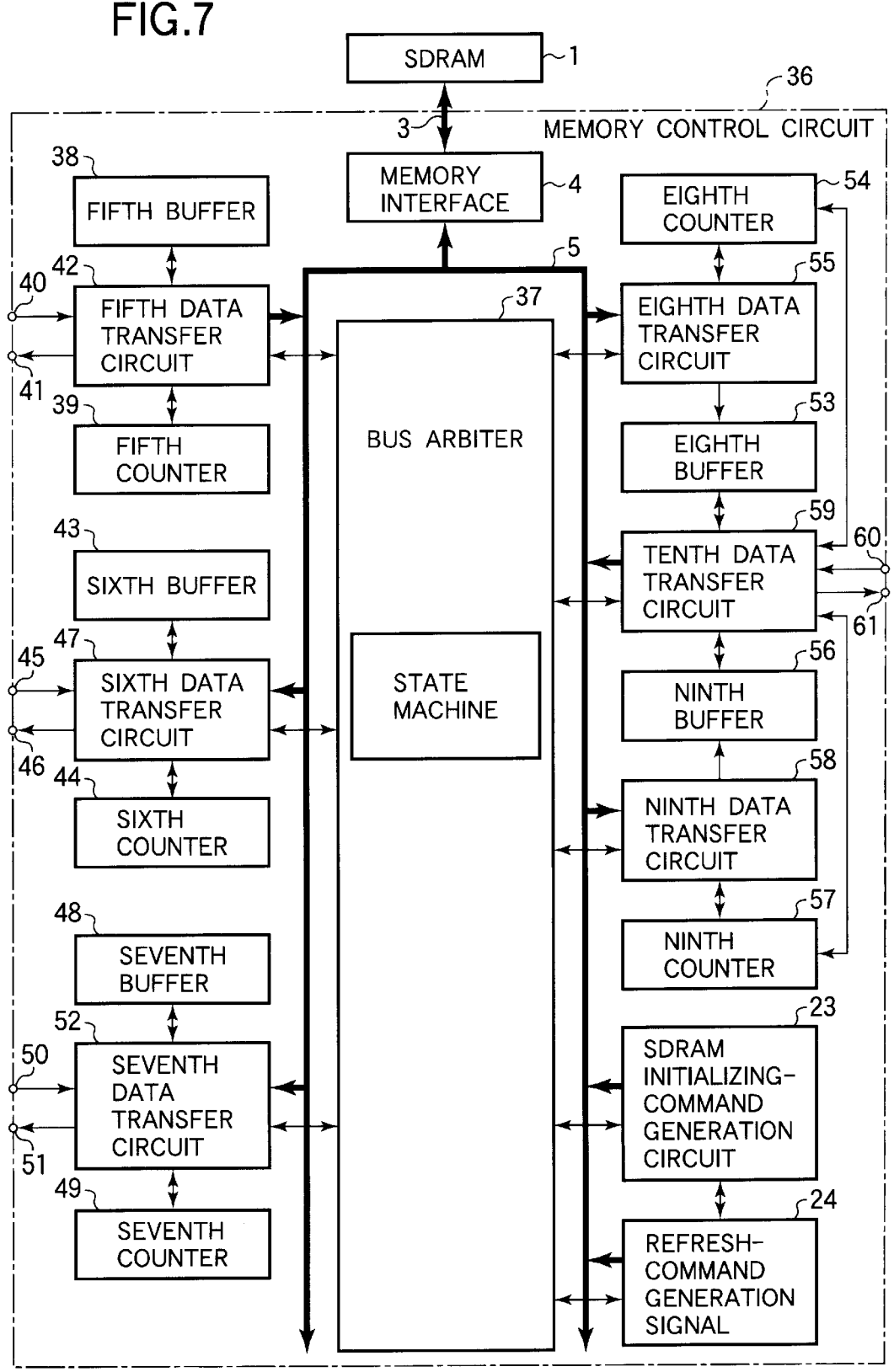
FIG. 7 is a diagram showing an arrangement of a memory control circuit (or an arrangement for performing a method for arbitrating a memory bus) in accordance with a third embodiment of the present invention.

FIG. 7 is a diagram showing a structure of the memory control circuit according to the third embodiment of the present invention. In FIG. 7, parts having the same functions as in those in the first embodiment are denoted by the same reference numerals to avoid double explanation thereof.

As shown in FIG. 7, a memory control circuit 36 includes a bus arbiter 37. The memory control circuit 36 also includes a fifth buffer 38 for temporarily storing data to be transferred to the SDRAM 1, a fifth counter 39 for counting number of pieces of data stored in the fifth buffer 38, a third input terminal 40 for receiving data and a control signal, a third output terminal 41 for outputting a control signal, and a fifth data transfer circuit 42 which writes the data received from the third input terminal 40 into the fifth buffer 38 and, when the execution of data transfer using the internal memory bus 5 is granted by the bus arbiter 37, which reads out data from the fifth buffer 38 and transmits the data to the SDRAM 1 via the memory interface 4.

Further, the memory control circuit 36 includes a sixth buffer 43 for temporarily storing the data transferred from the SDRAM 1, a sixth counter 44 for counting number of pieces of data stored in the sixth buffer 43, a fourth input terminal 45 for receiving a control signal, a fourth output terminal 46 for outputting data and a control signal, and a sixth data transfer circuit 47 which, when execution of the data transfer using the internal memory bus 5 is granted by the bus arbiter 37, writes data from the SDRAM 1 via the memory interface 4 into the sixth buffer 43, reads data from the sixth buffer 43 according to the control signal received from the fourth input terminal 45, and outputs the read data from the fourth output terminal 46 together with the control signal.

Furthermore, the memory control circuit 36 includes a seventh buffer 48 for temporarily storing data transferred from the SDRAM 1, a seventh counter 49 for counting number of pieces of data stored in the seventh buffer 48, a fifth input terminal 50 for receiving a control signal, a fifth output terminal 51 for outputting data and a control signal, and a seventh data transfer circuit 52 which, when execution of the data transfer using the internal memory bus 5 is granted by the bus arbiter 37, writes the data from the SDRAM 1 via the memory interface 4 into the seventh buffer 48, reads out data from the seventh buffer 48 according to the control signal received from the fifth input terminal 50, and outputs the data from the fifth output terminal 51 together with the control signal.

Additionally, the memory control circuit 36 includes an eighth buffer 53 for temporarily storing data transferred from the SDRAM 1, an eighth counter 54 for counting number of pieces of data stored in the eighth buffer 53, and an eighth data transfer circuit 55, when execution of the data transfer using the internal memory bus 5 is granted by the bus arbiter 37, writes data from the SDRAM 1 via the memory interface 4 into the eighth buffer 53.

Moreover, the memory control circuit 36 includes a ninth buffer 56 for temporarily storing data transferred from the SDRAM 1, a ninth counter 57 for counting number of pieces of data stored in the ninth buffer 56, and a ninth data transfer circuit 58 which, when execution of the data transfer using the internal memory bus 5 is granted by the bus arbiter 37, writes the data from the SDRAM 1 via the memory interface 4 into the ninth buffer 56.

The memory control circuit 36 includes a tenth data transfer circuit 59, which, when execution of the data transfer using the internal memory bus 5 is granted by the bus arbiter 37, reads out the data from the eighth and ninth buffers 53 and 56, applies suitable operation over the read-out respective data and then writes its result data into the SDRAM 1.

The memory control circuit 36 includes a sixth input terminal 60 and a sixth output terminal 61, to and from which the control signal is inputted/outputted.

The memory control circuit according to the third embodiment shown in FIG. 7 operates as follows.

In the third embodiment, data received from the third input terminal 40 is, for example, graphics data transferred from a microprocessor (not shown) or the like, and the control signal received from the third input terminal 40 is, for example, a transfer start instruction for the data enable signal and graphics data. Also, the control signal issued from the third output terminal 41 is, for example, a transfer end signal for the graphics data. Further, the transfer start instruction of the graphics data received from the third input terminal 40 is issued before the microprocessor transfers the first data to the third input terminal 40, and the transfer end signal of the graphics data outputted from the third output terminal 41 becomes an active state when the fifth data transfer circuit 42 completes the transfer of the data last transferred by the microprocessor to the third output terminal 41 to the SDRAM 1.

Similarly, a control signal received from the fourth input terminal 45 is a transfer start instruction for the graphics data to be transmitted by the microprocessor, data outputted from the fourth output terminal 46 is graphics data to be transferred by the microprocessor, and control signals outputted from the fourth output terminal 46 are the data enable signal and the transfer end signal for the graphics data. Also, a transfer start instruction for graphics data received from the fourth input terminal 45 is issued before the first data is outputted from the fourth output terminal 46, and a transfer end signal for graphics data outputted from the fourth output terminal 46 becomes active when the last data to be transferred to the microprocessor is outputted from the fourth output terminal 46. The data is outputted from the output terminal 46 in synchronism with the data enable signal.

Further, control signals received from the fifth input terminal 50 are a data enable signal indicative of the effective display duration as well as a vertical synchronization signal for use in the scanning of a display unit (not shown). Furthermore, data outputted from the fifth output terminal 51 is graphics data to be displayed on the display unit, and control signals outputted from the fifth output terminal 51 are a vertical synchronization signal received from the fifth input terminal 50 as well as a vertical synchronization signal obtained by suitably delaying a data enable signal without changing its waveform and the data enable signal. When the data enable signal received from the fifth input terminal 50 is in its enable state, data is read out from the fifth buffer 38 and outputted from the fifth output terminal 51.

The eighth data transfer circuit 55, the ninth data transfer circuit 58 and the tenth data transfer circuit 59 are used to transfer data between different memory areas of the SDRAM 1 on a block basis. Before transferring the data to the SDRAM 1, the tenth data transfer circuit 59 perform suitable operation over the data with use of data read out by the eighth data transfer circuit 55 and the ninth data transfer circuit 58. This sort of operation includes operation such as alpha blending or raster operation generally carried out in graphics operation.

Further, a control signal received from the sixth input terminal 60 is a transfer start instruction for graphics data and a control signal issued from the sixth output terminal 61 is a transfer end signal for the graphics data. Additionally, a transfer start instruction for graphics data received from the sixth input terminal 60 is transmitted by the microprocessor before the eighth data transfer circuit 55 first issues the read command to the SDRAM 1, and a transfer end signal for graphics data outputted from the sixth output terminal 61 is transmitted to the microprocessor when the tenth data transfer circuit 59 completes transfer of the last data to the SDRAM 1.

The fifth counter 39 counts the number of pieces of data stored in the fifth buffer 38 in the same manner as the first counter 8 in the first embodiment. In a similar manner to the third counter 16 in the first embodiment, the sixth counter 44 and the seventh counter 49 count the number of pieces of data stored in the sixth and seventh buffers 43 and 48 respectively.

The eighth counter 54 increments its count value by "1" each time the eighth data transfer circuit 55 issues a read command to the SDRAM 1, whereas the eighth counter 54 decrements its count value by "1" each time the tenth data transfer circuit 59 reads out one piece of data from the eighth buffer 53. Similarly, the ninth counter 57 increments its count value by "1" each time the ninth data transfer circuit 58 issues a read command to the SDRAM 1, whereas the ninth counter 57 decrements its count value by "1" each time the tenth data transfer circuit 59 reads out one piece of data from the ninth buffer 56.

When the fifth and sixth buffers 38 and 43 erase all the data stored in each buffer when the fifth and sixth data transfer circuits 42 and 47 respectively. Further, the seventh buffer 48 erases all the data stored in the buffer when the vertical synchronization signal is inputted to the seventh data transfer circuit 52. Furthermore, the eighth and ninth buffers 53 and 56, when the tenth data transfer circuit 59 receives the transfer start instruction for the graphics data, erase all the data stored in the respective buffers. When all the data stored in the buffers are erased, the counters associated with the respective buffers reset the count value to "0". This is, as in the first embodiment, for the purpose of enabling return of the system to its normal state when the transfer start instruction for the graphics data was issued even at the time of occurrence of erroneous operation.

When the count values of the fifth, sixth and seventh counters 39, 44 and 49 are "32" or more, the fifth, sixth and seventh data transfer circuits 42, 47 and 52 transmit the request signal to the bus arbiter 37 respectively. When the acknowledge signal is transmitted from the bus arbiter 37, the data transfer is executed until the count values of the fifth, sixth and seventh counters 39, 44 and 49 become "0".

Further, when the count value of the eighth counter 54 is smaller than the whole data capacity of the eighth buffer 53, the eighth data transfer circuit 55 transmits the request signal to the bus arbiter 37. When the acknowledge signal is transmitted from the bus arbiter 37, the data transfer is executed until the count value of the eighth counter 54 becomes equal to the whole data capacity of the eighth buffer 53. Similarly, when the count value of the ninth counter 57 is smaller than the whole data capacity of the ninth buffer 56, the ninth data transfer circuit 58 transmits the request signal to the bus arbiter 37. Then when the acknowledge signal is transmitted from the bus arbiter 37, the data transfer is executed until the count value of the ninth counter 57 becomes equal to the whole data capacity of the ninth buffer 56.

When any of the count values of the eight and ninth counters 54 and 57 is other than "0", the tenth data transfer circuit 59 transmits the request signal to the bus arbiter 37. When the acknowledge signal was transmitted to the bus arbiter 37, the data transfer is executed until any of the count values of the eighth and ninth counters 54 and 57 becomes "0". Since the tenth data transfer circuit 59 is arranged to read out data from a plurality of buffers and to execute the data transfer, the conditions of generating the request signal and terminating the data transfer are associated with a plurality of counters.

Figure 8:
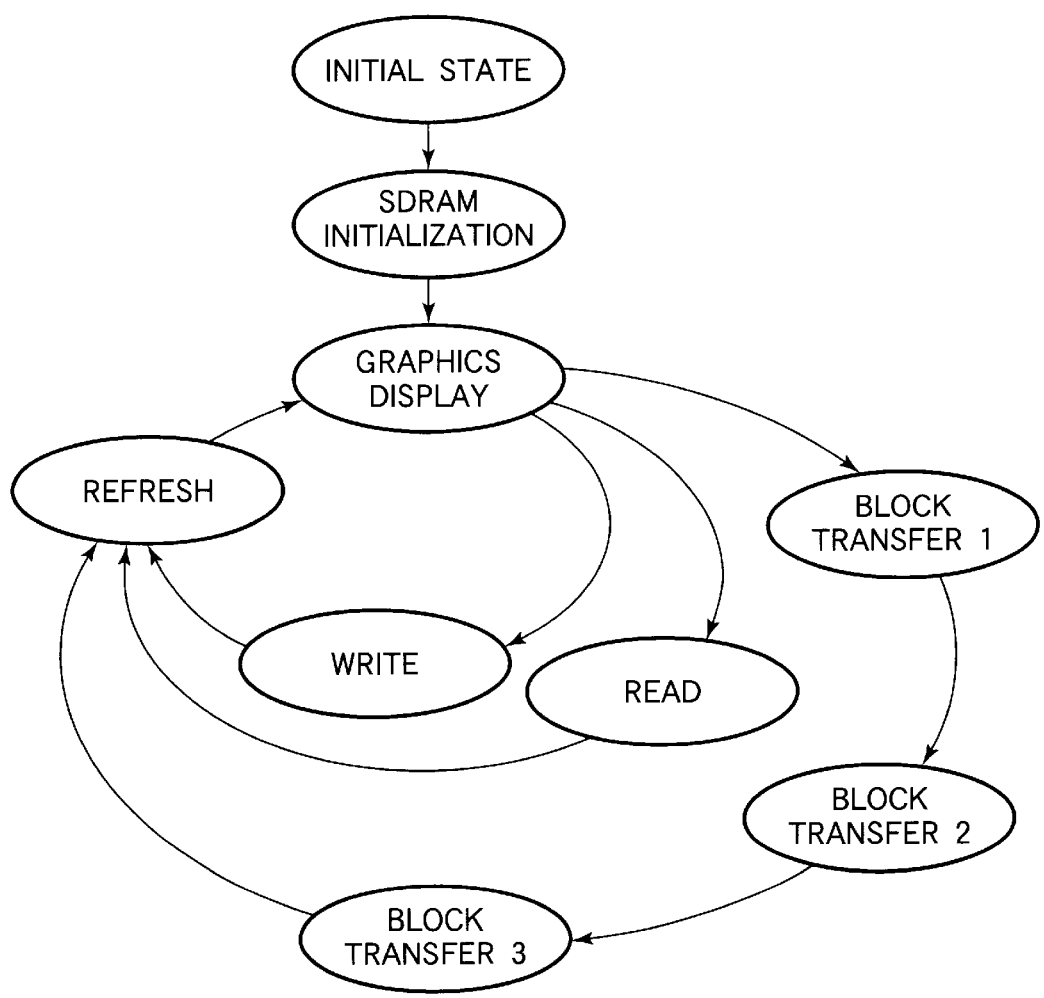
FIG. 8 is a diagram showing a state transition of a state machine incorporated in a bus arbiter used in the third embodiment.

In this case, the state transition diagram of the state machine built in the bus arbiter 37 is as shown in FIG. 8. In other words, when the memory control circuit 36 starts its operation, the then state of the state machine is as shown by an "initial state" in FIG. 8. Until the shift to an "SDRAM initialization" state where initialization of the SDRAM 1 is carried out at suitable timing, the transition diagram is similar to in the first embodiment.

Referring to FIG. 8, a "graphics display" state is associated with the seventh data transfer circuit 52 for execution of data transfer from the SDRAM 1 to the display unit, a "write" state is associated with the fifth data transfer circuit 42 used to write the data of the microprocessor in the SDRAM 1, a "read" state is associated with the sixth data transfer circuit 47 used to read out data from the SDRAM 1 and to transfer it to the microprocessor, a "block transfer 1" state is associated with the tenth data transfer circuit 59, a "block transfer 2" state is associated with the eighth data transfer circuit 55, and a "block transfer 3" state is associated with the ninth data transfer circuit 58, respectively.

When the initialization of the SDRAM 1 is completed, the state machine shifts its current state to the "graphics display" state as a renewed current state. At this time, if the seventh data transfer circuit 52 transmits the request signal to the bus arbiter 37, then the bus arbiter 37 transmits the acknowledge signal to the seventh data transfer circuit 52. When the seventh data transfer circuit 52 does not transmit the request signal yet or when the seventh data transfer circuit 52 informed the bus arbiter 37 of completion of the data transfer, the state machine shifts its current state to a renewed current state.

There are three states including "write", "read" and "block transfer 1" as the stages followed by the "graphics display" state. When the fifth data transfer circuit 42 is transmitting the request signal, the state machine shifts its current state to the "write" state as a renewed current state. When the fifth data transfer circuit 47 is not transmitting the request signal and the sixth data transfer circuit 47 is transmitting the request signal, the state machine shifts its current state to the "read" state as a renewed current state. When both of the fifth and sixth data transfer circuits 42 and 47 are not transmitting the request signal, the state machine shifts its current state to the "block transfer 1" state as a renewed current state.

Therefore, when the state machine shifts its current state to the "graphics display" state as a renewed current state and the fifth data transfer circuit 42 is transmitting the request signal, the state machine shifts its current state to the "write" state as a renewed current state and the bus arbiter 37 transmits the acknowledge signal to the fifth data transfer circuit 42. When the fifth data transfer circuit 42 informs the bus arbiter 37 of completion of the data transfer, the state machine shifts its current state to the "refresh" state as a renewed current state.

Similarly, when the state machine shifts its current state to a state next to the "graphics display" state, the fifth data transfer circuit 42 is not transmitting the request signal, and only the sixth data transfer circuit 47 is transmitting the request signal, then the state machine shifts its current state to the "read" state and the bus arbiter 37 transmits the acknowledge signal to the sixth data transfer circuit 47. When the sixth data transfer circuit 47 transmitted the transfer end signal of the graphics data finally from the fourth output terminal 46 but not received yet the transfer start instruction of the graphics data from the fourth input terminal 45, this means that the microprocessor requires data stored in the SDRAM 1. Accordingly, in order to give an opportunity of data transfer to the tenth data transfer circuit 59, it is desirable that the sixth data transfer circuit 47 should not transmit the request signal to the sixth data transfer circuit 47 regardless of the count value of the sixth counter 44. When the sixth data transfer circuit 47 informs the bus arbiter 37 of completion of the data transfer, the state machine shifts its current state to the "refresh" state.

Assume that, when the state machine shifts its current state to the state next to the "graphics display" state, any of the fifth and sixth data transfer circuits 42 and 47 fail to transmit the request signal. Then the state machine shifts its current state to the "block transfer 1" state so that, when the tenth data transfer circuit 59 already transmits the request signal, the bus arbiter 37 transmits the acknowledge signal to the tenth data transfer circuit 59. When the tenth data transfer circuit 59 is not transmitting the request signal at the time of occurrence of the state transition to the "block transfer 1" state, when the tenth data transfer circuit 59 informs the bus arbiter 37 of completion of the data transfer, or when the tenth data transfer circuit 59 does not receive the transfer start instruction of the graphics data yet from the sixth input terminal 60 after transmitting the transfer end signal of the graphics data finally from the sixth output terminal 61; the state machine is shifted to the "block transfer 2" state. When the tenth data transfer circuit 59 does not receive the transfer start instruction of the graphics data yet from the sixth input terminal 60 after transmitting the transfer end signal of the graphics data finally from the sixth output terminal 61, it is unnecessary to perform the block transfer. In this case, thus, the tenth data transfer circuit 59 may be arranged not to transmit the request signal to the bus arbiter 37.

The "block transfer 2" and "block transfer 3" states are associated with the eighth and ninth data transfer circuits 55 and 58 respectively. Thus the state transition takes place under the condition explained in connection with the "block transfer 1" state and under a similar condition. At this time, even when the eighth and ninth data transfer circuits 55 and 58 were transmitting the request signal, no reception of the tenth data transfer circuit 59 of the transfer start instruction of the graphics data yet from the sixth input terminal 60 after transmission of the transfer end signal of the graphics data finally from the sixth output terminal 61 will cause the tenth data transfer circuit 59 not to generate the acknowledge signal to the eighth and ninth data transfer circuits 55 and 58 and cause the state machine to shift its current state to the next state as a renewed current state. When the tenth data transfer circuit 59 does not receive the transfer start instruction of the graphics data yet, the eight and ninth data transfer circuits may be arranged not to transmit the request signal to the bus arbiter 37. The next state of the "block transfer 3" state is the "refresh" state, in which occurrence of the state transition causes the state to return to the "graphics display" state.

In this way, when it is unnecessary to simultaneously perform the data transfer from the microprocessor to the SDRAM 1, the data transfer from SDRAM 1 to the microprocessor and the data transfer from the SDRAM 1 to the SDRAM 1, the period during which the state machine makes one round of state transitions can be made faster by providing a branch to the state transition of the state machine. Since the microprocessor can know the data transfer now being executed by referring to the transfer start instruction of the graphics data and the transfer end signal, it is only required not to issue a new transfer instruction of the graphics data until the data transfer being executed is completed.

The branch of the state transition of the state machine can be used even for the purpose of assigning a priority order to the data transfer. Assume now that the fifth, sixth and tenth data transfer circuits 42, 47 and 49 are all receiving the transfer start instructions of the graphics data and sometimes transmit the request signals. Then the data transfer carried out by the fifth data transfer circuit 42 has the highest priority order the data transfer carried out by the sixth data transfer circuit 47 has the next highest priority order. The data transfer carried out by the eighth, ninth and tenth data transfer circuits 55, 58 and 59 have the lowest priority order, and thus these three data transfer circuits can be regarded as having the same priority order of the data transfer carried out thereby.

While the seventh data transfer circuit 52 is transmitting the request signal, even when any of the eighth, ninth and tenth data transfer circuits 55, 58 and 59 is executing the data transfer, the bus arbiter 37 informs the eighth, ninth and tenth data transfer circuits 55, 58 and 59 so as to interrupt the data transfer being executed regardless of the value of the counter. In order to inform of the interruption of the data transfer, an exclusive signal line may be provided for each data transfer circuit. Or the notification may be carried out, for example, by stopping transmission of the acknowledge signal to the data transfer circuit now performing the data transfer and setting the semiconductor to its low level. It is desirable that the data transfer circuit whose acknowledge signal was set to low level stop the data transfer being executed as fast as possible by a suitable method and inform the bus arbiter 37 of completion of the data transfer. When the completion of the data transfer is informed to the bus arbiter 37 from the data transfer circuit, the state machine shifts its current state to the next state as a renewed current state.

Further, the invention is arranged so that, while the seventh data transfer circuit 52 is transmitting the request signal, even when the bus arbiter 37 will not transmit the acknowledge signal to the eighth, ninth and tenth data transfer circuits 55, 58 and 58 and the state machine shifts its current state to the next state, even when these data transfer circuits are transmitting the request signal to the bus arbiter 37.

The seventh data transfer circuit 52 is executing the data transfer from the SDRAM 1 to the display unit, and the execution start of the block transfer of graphics data is generally allowed to be shifted faster or later by about one frame. Meanwhile, the data transfer to the display unit is required to have the highest real-time performance because the data transfer is required to display video data accurately at predetermined coordinates on the display screen, and therefore the data transfer is required to be set to have the highest priority order. In this way, when the data transfer circuit having the highest priority order is transmitting the request signal, the data transfer of the data transfer circuits having lower priority orders is interrupted or the acknowledge signal is arranged not to be sent to the data transfer circuits having the lower priority orders. Therefore, memory bus arbitration can be realized suitably without generating overflow or underflow in the buffers.

Fourth Embodiment

Figure 9:
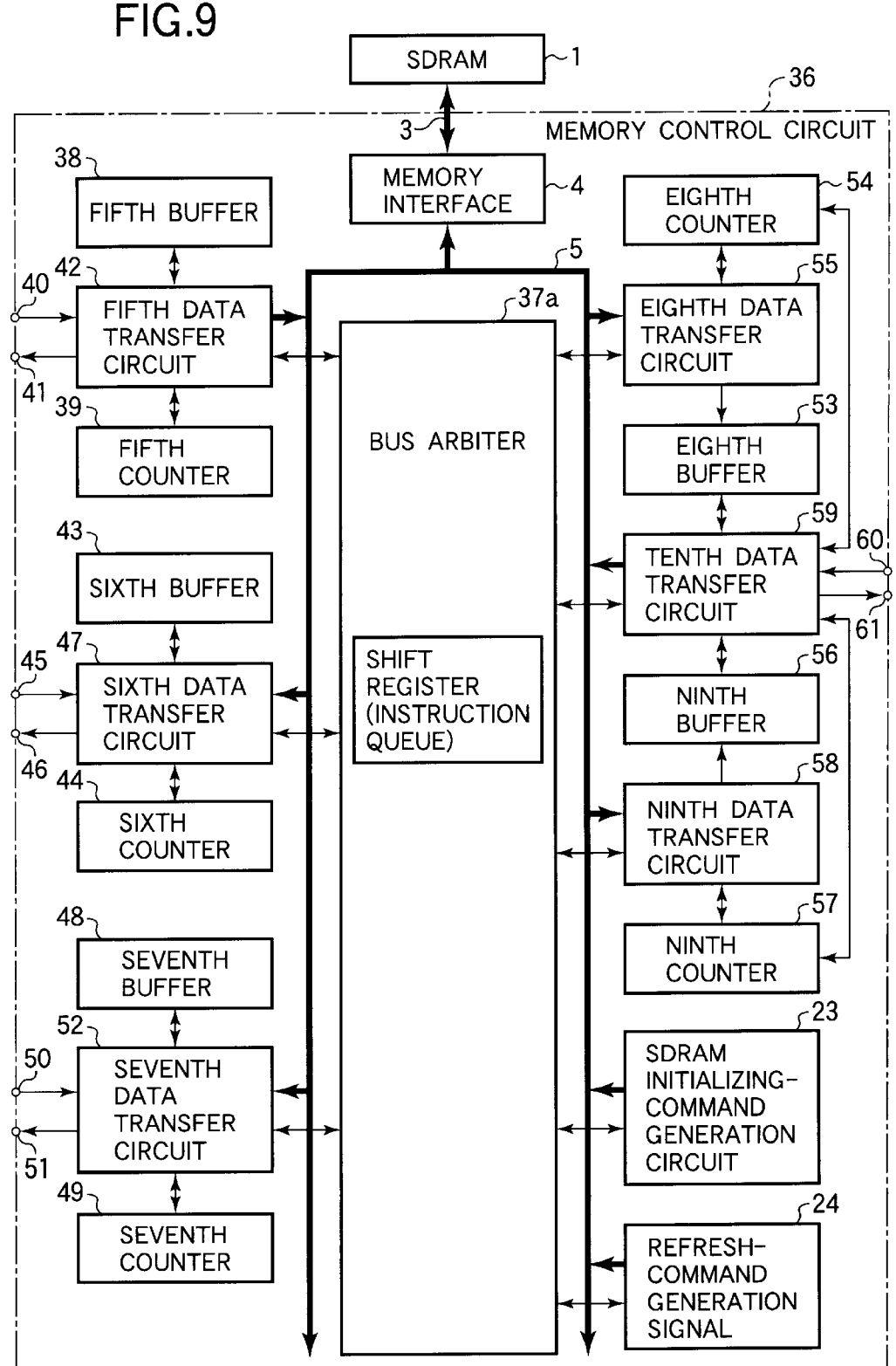
FIG. 9 is a diagram showing an arrangement of a memory control circuit (or an arrangement for performing a method for arbitrating a memory bus) in accordance with a fourth embodiment of the present invention.

FIG. 9 is a diagram showing a structure of a memory control circuit in accordance with a fourth embodiment of the present invention. In FIG. 9, parts having the same functions as those in FIG. 7 of the third embodiment are assigned the same reference numerals. The memory control circuit according to the fourth embodiment is different from that according to the third embodiment in a respect that the state machine built in the bus arbiter 62 is replaced by an instruction queue. Since the memory control circuit according to the fourth embodiment has the same arrangement as that according to the third embodiment except for the bus arbiter, explanation will be directed only to the operation of the instruction queue incorporated in a bus arbiter 37a.

The instruction queue is formed by a shift register having seven (which is equal to a maximum number of circuits requiring the access to the memory bus at the same time) stages of registers. In the fourth embodiment, there are seven circuits including the six data transfer circuits 42, 47, 52, 55, 58 and 59 plus the single refresh command generation circuit 24, which can request the access to the memory bus at the same time.

In the fourth embodiment, when the memory control circuit 36 starts its operation, values of the seven registers in the shift register are all initialized to "0". When any of the seven circuits requesting the access to the memory bus transmits the request signal to the bus arbiter 37a, a value corresponding to the corresponding circuit is entered into the tail of the instruction queue. When the memory control circuit 36 starts its operation, the instruction queue has a length of "0". By previously registering the value corresponding to the circuit with the instruction queue, the execution of a data transfer instruction and a refresh instruction can be reserved. However, when the value of the corresponding circuit is already registered with any of the seven registers, adjustment is made so that these circuits will not be doubly registered even when the circuits transmit the request signal. Further, for example, the refresh command generation circuit 24 is always transmitting the request signal to the bus arbiter 37a except when the circuit informs of the completion of the refresh operation, as mentioned in the first embodiment.

Assume now that the value associated with the fifth data transfer circuit 42 is "5" and that the instruction queue has a length of "0" when the fifth data transfer circuit 42 transmitted the request signal to the bus arbiter 37a. Then, the value "5" is entered into a first stage of register that is a head of the instruction queue and the instruction queue has a length of "1" that is larger by "1" than the initial length "0". Similarly, when the instruction queue has a length of "3" and when a value associated with the fifth data transfer circuit 42 is entered, the value "5" is entered into a fourth stage of register so that the instruction queue has a length of "4" that is larger by "1" than the previous value "3".

The same holds true even for registration of values associated with the six circuits other than the above. For example, a value associated with the sixth data transfer circuit 47 is "6", a value associated with the seventh data transfer circuit 52 is "7", a value associated with the eighth data transfer circuit 55 is "8", a value associated with the ninth data transfer circuit 58 is "9", a value associated with the tenth data transfer circuit 59 is "10", and a value associated with the refresh command generation circuit 24 is "11". In this manner, the circuit which transmitted the request signal earlier is entered sequentially into the instruction queue.

When any ones of the seven circuits transmit the request signal at the same time, in particular, it is required that ones of the circuits be entered in a preceding stage of the instruction queue according to a predetermined priority order, or be entered earlier according to a predetermined priority order.

The bus arbiter 37a transmits the acknowledge signal to the circuit associated with the value held in the first stage of the register that is a head of the instruction queue. For example, if the value held in the first stage of register is "5", then the bus arbiter 37a transmits the acknowledge signal to the fifth data transfer circuit 42. Thereafter, when the bus arbiter 37a is informed by the fifth data transfer circuit 42 of completion of the data transfer therefrom, the bus arbiter shifts the values of the registers in the shift register to the respective stages previous by "1", and transmits the acknowledge signal to the circuit corresponding to the value held at the head of the instruction queue. Thereafter, similar shifting operation will be repeated each time the completion of the data transfer or refresh operation is informed.

Assume now that priority order is applied to the execution of the data transfer in an order of the data transfer from the microprocessor to the SDRAM 1, the data transfer from the SDRAM 1 to the microprocessor, and the data transfer from the SDRAM 1 to the SDRAM 1 as carried out in the third embodiment. Then when the fifth data transfer circuit 42 is transmitting the request signal or the value "5" is held in the instruction queue, the values associated with the circuits are not entered into the tail of the instruction queue even when the sixth, eighth, ninth and tenth data transfer circuits 47, 55, 58 and 59 are transmitting the request signals. Further, when the sixth data transfer circuit 47 is transmitting the request signal or when the value "6" is held in the instruction queue, the values associated with the respective circuits are not entered into the tail of the instruction queue even when the eight, ninth and tenth data transfer circuits 55, 58 and 59 are transmitting the request signals.

Further, when data transfer to the display unit is required, it is desirable that the data transfer to the SDRAM 1 from the SDRAM 1 be prevented. To this end, when the seventh data transfer circuit 52 generated the request signal, the values associated with the respective circuits should not be entered into the tail of the instruction queue, even when the eighth, ninth and tenth data transfer circuits 55, 58 and 59 are transmitting the request signals. Further, even when the values associated with the circuits held at the head of the instruction queue, the bus arbiter is arranged not to transmit the acknowledge signal but to perform the shifting operation.

When it is desired to interrupt the data transfer being executed by the eighth, ninth and tenth data transfer circuits 55, 58 and 59, the interruption can be realized by the same method as explained in the third embodiment. In this way, even when the state machine is replaced by the instruction queue, the arbitration of the memory bus can be realized.

In the fourth embodiment, when the refresh command generation circuit 24 transmitted the request signal to the bus arbiter 37*a*, the value "11" has been arranged to be entered into the instruction queue. However, in place of registration of the value associated with the refresh command generation circuit 24, the bus arbiter 37*a* may transmit the acknowledge signal to the refresh command generation circuit 24 when the length of the instruction queue is "0".

Fifth Embodiment

Figure 10:
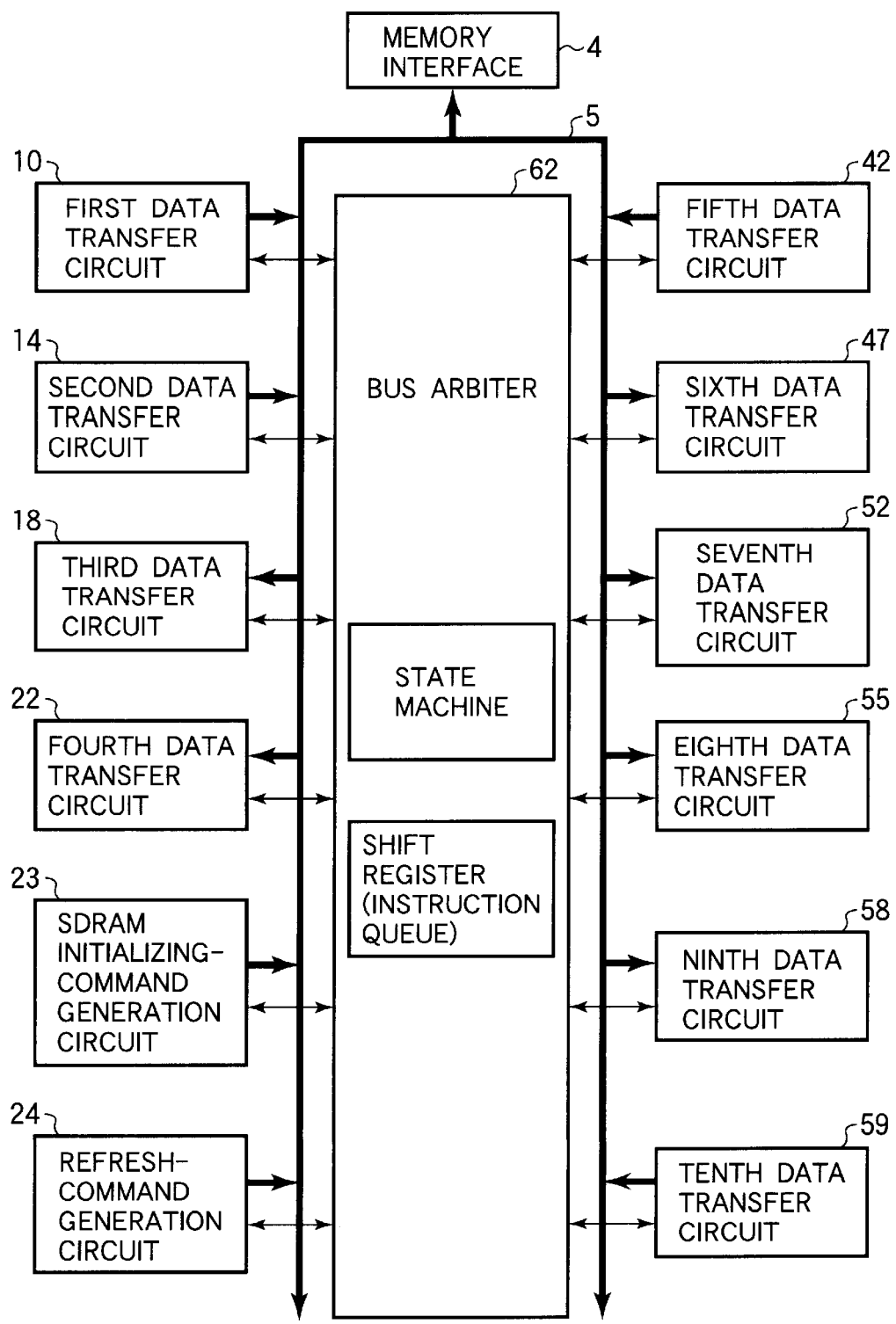
FIG. 10 is a diagram showing an arrangement of a memory control circuit (or an arrangement for performing a method for arbitrating a memory bus) in accordance with a fifth embodiment of the present invention.

A memory control circuit according to a fifth embodiment of the present invention includes four data transfer circuits described in the first embodiment and the six data transfer circuits described in the fourth embodiment that are all connected to the same internal memory bus. The memory control circuit according to the fifth embodiment is a circuit for implementing a method for arbitrating a memory bus according to the present invention. FIG. 10 shows a bus arbiter 62 of the fifth embodiment and circuits connected to the internal memory bus 5. For simplicity, constituent elements of the memory control circuit that are shown in FIG. 1, 7, or 9 such as the buffers, the counters, the input terminals, the output terminals and the command generation circuits as well as elements such as the SDRAM and the external memory bus are omitted from FIG. 10. Accordingly, not only FIG. 10 but also FIGS. 1, 7 and 9 will be referred to in the following description.

In the fifth embodiment, the first, second, third and fourth data transfer circuits 10, 14, 18 and 22 treat moving picture data and perform data transfer with an external circuit (not shown in the figures) in each frame. Further, the seventh data transfer circuit 52 transfers graphics data from the SDRAM 1 to a display unit (not shown) on every frame basis. Furthermore, the five data transfer circuits 42, 47, 55, 58 and 59 other than the above-described circuits execute transfer of the graphics data on the basis of the a graphics transfer start instruction non-periodically issued.

At this time, it is desirable that the priority orders of the data transfer carried out by the four data transfer circuits 10, 14, 18 and 22 for treatment of moving picture data and the data transfer carried out by the seventh data transfer circuit 52 for transfer of graphics data to the display unit be higher than the priority orders of data transfer non-periodically carried out by the remaining five data transfer circuits 42, 47, 55, 58 and 59. This is because the latter five data transfer circuits 42, 47, 55, 58 and 59 for performing non-periodical data transfer can delay timing of the data transfer to some extent by performing a suitable handshake with the microprocessor; whereas, the former five transfer circuits 10, 14, 18, 22 and 52 are required to transfer data at timing demanded by the external circuit, a display unit, and the like.

Figure 11:
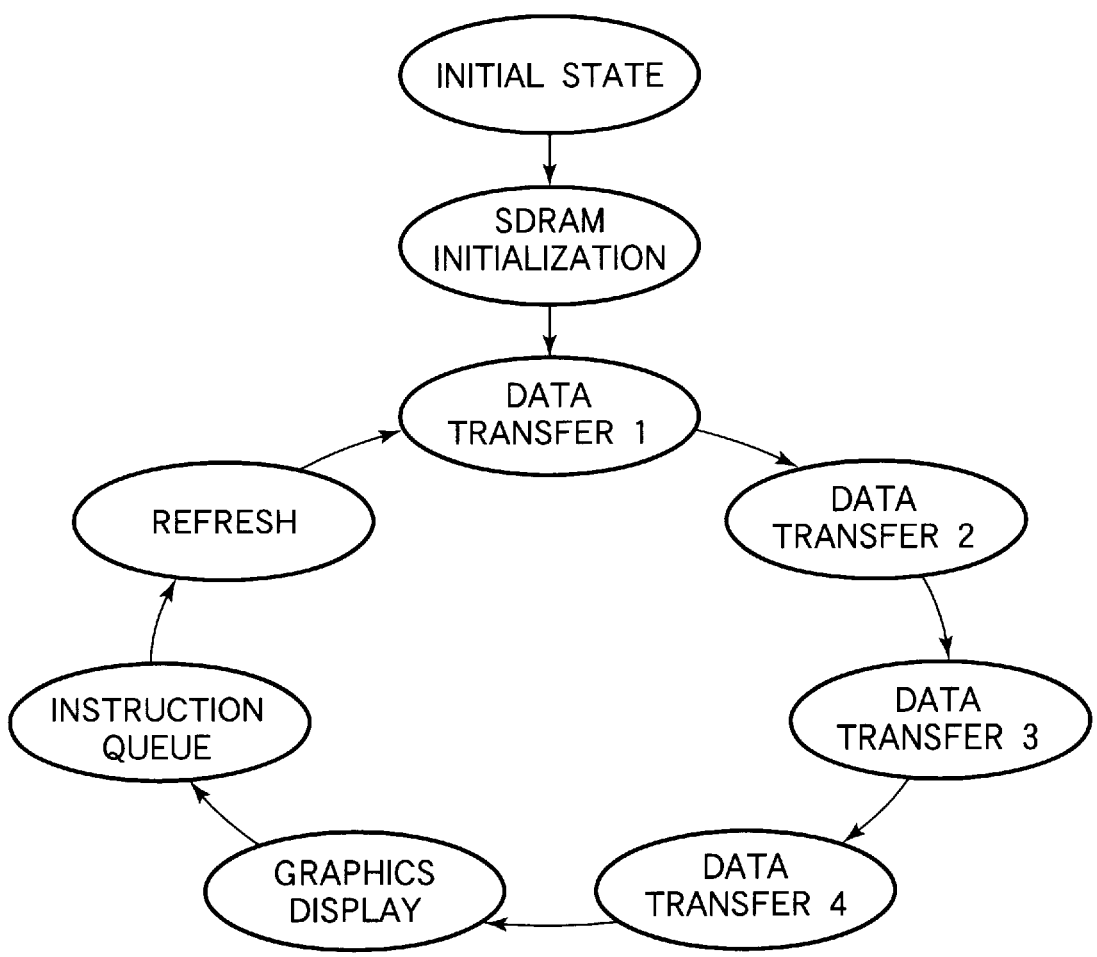
FIG. 11 is a diagram showing a state transition of a state machine incorporated in a bus arbiter used in the fifth embodiment.
Figure 12:
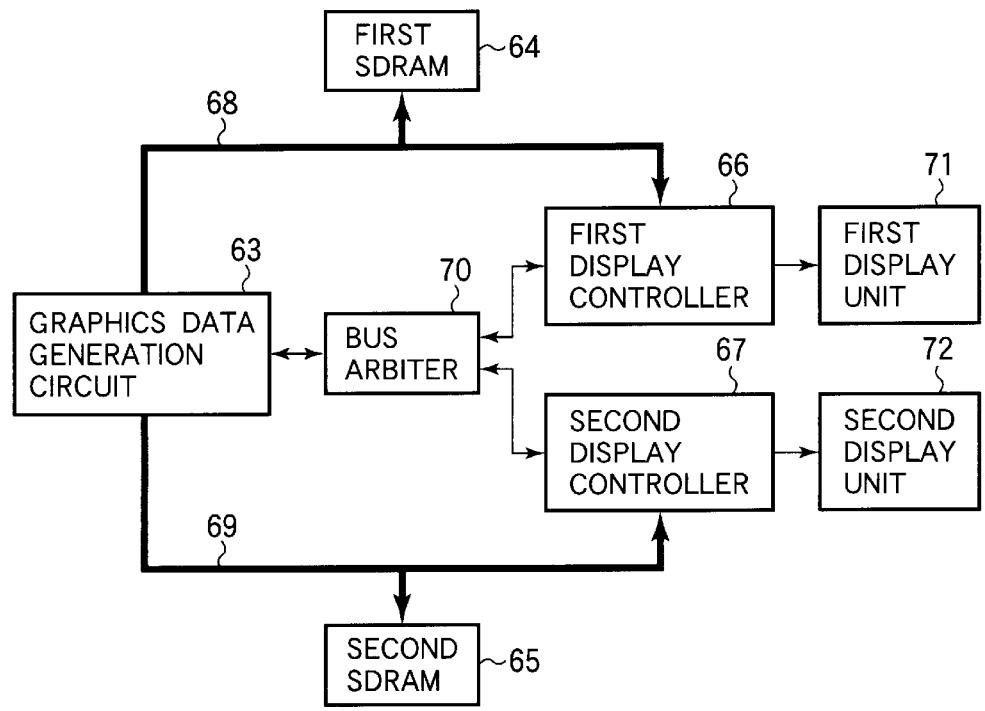
FIG. 12 is a diagram showing an arrangement of the prior art memory control circuit.
Figure 13:
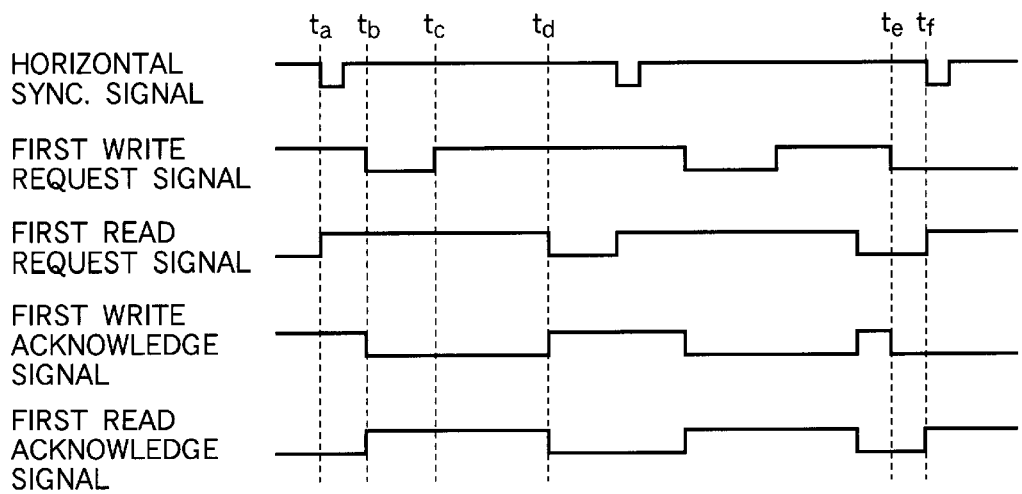
FIG. 13 is a timing chart for explaining operation of the memory control circuit of FIG. 12.

In order to assign the priority order to the data transfer in this way, the bus arbiter 62 in the fifth embodiment incorporates both of the state machine and the instruction queue and assigns one state of the state machine to the instruction queue. FIG. 11 shows a state transition diagram of the state machine, wherein an illustrated "instruction queue" state is assigned to the instruction queue. States other than the above are the same as explained in the first or third embodiment.

In the fifth embodiment, only the fifth, sixth, eighth, ninth and tenth data transfer circuits 42, 47, 55, 58 and 59 register their values with the instruction queue. Accordingly, the number of stages in the shift register formed as the instruction queue is only required to be five in the fifth embodiment.

When the state machine shifts its current state from the "graphics display" state to the "instruction queue" state, the bus arbiter 62 transmits the acknowledge signal to the data transfer circuit associated with the value held at the head of the instruction queue. When the length of the instruction queue is "0", the bus arbiter will not transmit the acknowledge signal to any of the data transfer circuits and immediately shifts its current state to the "refresh" state as the renewed current state. Further, when the data transfer circuit associated with the value held at the head of the instruction queue informs the bus arbiter 62 of completion of the data transfer, the contents of the shift register are shifted towards the head of the instruction queue by one stage and the state machine shifts its current state to the "refresh" state as a renewed current state. The data transfer circuit associated with the value newly entered into the head of the instruction queue is executed when the state machine makes a round of state transitions and again shifts its current state to the "instruction queue" state.

When any one of the five data transfer circuits, namely, the first, second, third, fourth and seventh data transfer circuits 10, 14, 18, 22 and 52 is transmitting the request signal to the bus arbiter 62, the bus arbiter 62 will not transmit the acknowledge signal to the data transfer circuit associated with the value held at the head of the instruction queue even when transition of the current state of the state machine to the "instruction queue" state takes place, and the state machine will immediately shift its current state to the "refresh" state as a renewed current state.

In the fifth embodiment, the data transfer associated with the value held in the instruction queue can be executed, e.g., in a duration other than the effective display duration where the data transfer associated with one state of the state machine is not carried out. Therefore, the transfer band width of the memory bus can be efficiently used.

In the fifth embodiment, the three data transfer circuits for transferring data to buffers are present. Thus when the reference edge in the vertical synchronization signal was detected in the third, fourth and seventh data transfer circuits 18, 22 and 52 at the same time, the number of pieces of data stored in the third, fourth and seventh buffers 15, 19 and 48 is "0", with the result that all the data transfer circuits 18, 22 and 52 will generate their request signals.

As has been mentioned in the third embodiment, the seventh data transfer circuit 52 executes the data transfer until the count value of the seventh counter 49 becomes equal to the whole capacity of the seventh buffer 48. Therefore, when the whole capacity of the seventh buffer 48 is made large to prevent underflow of the buffer, a long time is required after the data transfer starts until the data transfer ends. In addition to it, giving consideration to the fact that the first and second data transfer circuits 10 and 14 perform the data transfer of thirty two pieces of data, when the state machine makes a round of state transitions and returns from the "data transfer 1" state again to the "data transfer 1" state for example, there is a high possibility that the first buffer overflows.

In this way, in the case where the number of data transfer circuits for transferring data from the SDRAM 1 to the buffers is large or where the capacity of the buffer for data to be transferred from the SDRAM 1 is large, if the numbers of pieces of data stored in the buffers become "0" at the same time, the number of pieces of data to be transferred to the SDRAM 1 becomes momentarily large regardless of the number of pieces of data outputted from the buffers to the external circuit.

Generally, detection of the reference edge in the vertical synchronization signal is followed by a vertical blanking duration and not followed immediately by the effective display duration. Thus a certain length of time allowance or margin exists before data is actually read out from the third, fourth and seventh buffers 15, 19 and 48. Accordingly, by making the number of pieces of data to be transferred in one data transfer smaller than that in the effective display duration in the vertical blanking duration, a time taken until passage of the state machine over a round of state transitions can be shortened and a failure of the arbitration of the memory bus can be avoided.

More specifically, the third and fourth data transfer circuits 18 and 22 may transfer sixteen pieces of data as a substitute for thirty-two pieces of data. Further, the seventh data transfer circuit 52 may transfer data as divided four times once for ¼ of the whole data capacity, not until the count value of the seventh counter 49 becomes equal to the whole data capacity of the seventh buffer 48.

There is the following another method other than the above method where the third and fourth data transfer circuits 18 and 22 transfer sixteen pieces of data through once data transfer. The bus arbiter 62 may not transmit the acknowledge signal to only any one of the third and fourth data transfer circuits 18 and 22 during one round of state transitions of the state machine in the vertical blanking duration. That is, if the bus arbiter has transmitted the acknowledge signal to the third data transfer circuit 18 in a round of state transitions of the state machine, the bus arbiter may not transmit the acknowledge signal to the third data transfer circuit 18 in a next round of state transitions of the state machine even when the third data transfer circuit 18 is transmitting the request signal. In this case, a time necessary for one round of state transitions of the state machine can be made faster.

In the above description, the duration for transfer of a smaller amount of data is detected using the vertical blanking duration. However, the duration for transfer of a smaller amount of data may be a duration after the number of pieces of data stored in the buffer becomes "0" until it becomes equal to the whole data capacity of the buffer.

Further, two or more of the control contents of the first to fifth embodiments may be combined into a memory control circuit according to the present invention. Also two or more of the control contents of the first to fifth embodiments may be combined into a method for arbitrating a memory bus according to the present invention. In addition, the number of data transfer circuits, the type of data to be transferred, and so on are not limited to the specific examples in the foregoing first to fifth embodiments but may be changed as necessary. Furthermore, for simplicity, the number of the SDRAM connected to the external memory bus is one in the first to fifth embodiments, the number of the SDRAM may be more than one. For example, a case where two SDRAMs each having sixteen bits data input/output terminal are used is equivalent to a case where one SDRAM having thirty-two data input/output terminal.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A memory control circuit for controlling a memory bus and a memory connected to said memory bus, comprising:
   a plurality of buffers which temporarily store at least either of data to be transferred to said memory or data transferred from said memory;
   a plurality of counters having count values respectively, the count values corresponding to numbers of pieces of data stored in said plurality of buffers respectively;
   a plurality of data transfer circuits which perform data transfer between said memory and said plurality of buffers using said memory bus; and
   a bus arbiter including a state machine which has a plurality of states associated with said plurality of data transfer circuits respectively and sets one of the plurality of states as a current state, transition of the current state of said state machine taking place in accordance with a predetermined transition condition;
   wherein
   (1) each of said plurality of data transfer circuits transmits a request signal demanding start of the data transfer to said bus arbiter on the basis of at least one of the count values of said plurality of counters,
   (2) if said data transfer circuit associated with the current state of said state machine transmits the request signal to said bus arbiter, said bus arbiter transmits an acknowledge signal granting start of the data transfer to said data transfer circuit associated with the current state of said state machine,
   (3) each of said plurality of data transfer circuits starts the data transfer at receipt of the acknowledge signal from said bus arbiter in response to the request signal, and stops the data transfer being executed on the basis of either number of pieces of data transferred after the receipt of the acknowledge signal or the count value of at least one of said plurality of counters,
   (4) when said data transfer circuit associated with the current state of said state machine either does not transmit the request signal or has stopped the data transfer being executed, said bus arbiter does not transmit the acknowledge signal to said data transfer circuit associated with the current state of said state machine, and transition of the current state of said state machine to a renewed current state takes place in accordance with the predetermined transition condition, and
   (5) said operations (1) to (4) are repeated.

2. The memory control circuit according to claim 1, wherein, in said operation (2), even when said data transfer circuit associated with the current state of said state machine is transmitting the request signal, if specific at least one of said plurality of data transfer circuits associated with a state other than the current state of said state machine is transmitting the request signal, said bus arbiter does not transmit the acknowledge signal to said data transfer circuit associated with the current state of said state machine, and transition of the current state of said state machine to a renewed current state takes place in accordance with the predetermined transition condition.

3. The memory control circuit according to claim 1, wherein, when said state machine has a plurality of states next to the current state, said state machine sets one of the plurality of states next to the current state as a renewed current state on the basis of the request signal transmitted by specific at least one of said plurality of data transfer circuits.

4. A memory control circuit for controlling a memory bus and a memory connected to said memory bus, comprising:

a plurality of buffers which temporarily store at least either of data to be transferred to said memory or data transferred from said memory;

a plurality of counters having count values respectively, the count values corresponding to numbers of pieces of data stored in said plurality of buffers respectively;

a plurality of data transfer circuits which perform data transfer between said memory and said plurality of buffers using said memory bus; and a bus arbiter including an instruction queue formed by a shift register;

wherein (1) each of said plurality of data transfer circuits transmits a request signal demanding start of the data transfer to said bus arbiter on the basis of at least one of the count values of said plurality of counters, (2) if said bus arbiter has received the request signal from at least one of said plurality of data transfer circuits, said bus arbiter enters a data transfer instruction, which is associated with at least one of said plurality of data transfer circuits that has transmitted the request signal, into a tail of said instruction queue, (3) said bus arbiter transmits an acknowledge signal granting start of the data transfer to said data transfer circuit associated with a data transfer instruction held at a head of said instruction queue, (4) each of said plurality of data transfer circuits starts the data transfer at receipt of the acknowledge signal from said bus arbiter in response to the request signal, and stops the data transfer being executed on the basis of either number of pieces of data transferred after the receipt of the acknowledge signal or the count value of at least one of said plurality of counters, (5) when said data transfer circuit has stopped the data transfer, said bus arbiter deletes the data transfer instruction associated with said data transfer circuit that has stopped the data transfer from said instruction queue and said bus arbiter shifts contents of said instruction queue in a latter stage by one stage toward the head of said instruction queue, and (6) said operations (1) to (5) are repeated.

5. The memory control circuit according to claim 4, wherein, in said operation (1), even when any of said plurality of data transfer circuits is transmitting the request signal, if specific at least one of said plurality of data transfer circuits other than said data transfer circuit that is transmitting the request signal, is transmitting the request signals or if the data transfer instruction associated with specific at least one of said plurality of data transfer circuits other than said data transfer circuit that is transmitting the request signal, is held in said instruction queue, said operation (2) is not executed so that said bus arbiter does not enter the data transfer instruction, which is associated with said data transfer circuit that is transmitting the request signal, into a tail of said instruction queue.

6. The memory control circuit according to claim 4, wherein, even when the data transfer instruction is held at the head of said instruction queue, if specific at least one of said plurality of data transfer circuits, which is other than said data transfer circuit associated with the data transfer instruction held at the head of said instruction queue, is transmitting the request signal or if the data transfer instruction associated with specific at least one of said plurality of data transfer circuits, which is other than said data transfer circuit associated with the data transfer instruction held at the head of said instruction queue, is held in said instruction queue, said operation (3) is not executed so that said bus arbiter does not transmit the acknowledge signal to said data transfer circuit associated with the data transfer instruction held at the head of said instruction queue.

7. A memory control circuit for controlling a memory bus and a memory connected to said memory bus, comprising:

a plurality of buffers which temporarily store at least either of data to be transferred to said memory or data transferred from said memory;

a plurality of counters having count values respectively, said count values corresponding to numbers of pieces of data stored in said plurality of buffers respectively;

a plurality of data transfer circuits which perform data transfer between said memory and said plurality of buffers using said memory bus; and a bus arbiter including an instruction queue formed by a shift register and a state machine which has a plurality of states each of which is associated with one of said plurality of data transfer circuits or the instruction queue, said state machine setting one of the plurality of states as a current state, transition of the current state of said state machine taking place in accordance with a predetermined transition condition, at least one of the plurality of states of said state machine being associated with said instruction queue, some of said plurality of data transfer circuits being associated with the plurality of states of said state machine respectively, a remainder of said plurality of data transfer circuits being associated with said instruction queue;

wherein (1) each of said plurality of data transfer circuits transmits a request signal demanding start of the data transfer to said bus arbiter on the basis of at least one of the count values of said plurality of counters, (2) when said data transfer circuit associated with the current state of said state machine transmits the request signal to said bus arbiter, said bus arbiter transmits an acknowledge signal granting start of the data transfer to said data transfer circuit associated with the current state of said state machine, (3) each of said plurality of data transfer circuits starts the data transfer at receipt of the acknowledge signal from said bus arbiter in response to the request signal, and stops the data transfer being executed on the basis of either number of pieces of data transferred after the receipt of the acknowledge signal or the count value of at least one of said plurality of counters, (4) when said data transfer circuit associated with the current state of said state machine either does not transmit the request signal or has stopped the data transfer being executed, said bus arbiter does not transmit the acknowledge signal to said data transfer circuit associated with the current state of said state machine, and transition of the current state of said state machine to a renewed current state takes place in accordance with the predetermined transition condition, (5) only when the current state of said state machine is associated with said instruction queue, at least a part of the data transfer instructions held in said instruction queue is executed sequentially from the head of said instruction queue, and after that transition of the current state of said state machine to a renewed current state takes place in accordance with the predetermined transition condition, and (6) said operations (1) to (5) are repeated.

8. The memory control circuit according to claim 7, wherein, in said operation (5), (5-1) if said bus arbiter receives the request signal from any of said plurality of data transfer circuits associated with said instruction queue, said bus arbiter enters the data transfer instruction associated with said data transfer circuit which has transmitted the request signal into the tail of said instruction queue, (5-2) said bus arbiter transmits the acknowledge signal granting start of the data transfer to said data transfer circuit associated with the data transfer instruction held at the head of said instruction queue, (5-3) each of said data transfer circuits associated with said instruction queue starts the data transfer at receipt of the acknowledge signal from said bus arbiter in response to the request signal, and stops the data transfer being executed on the basis of either number of pieces of data transferred after the receipt of the acknowledge signal or the count values of at least one of said plurality of counters, (5-4) when said data transfer circuit has stopped the data transfer, said bus arbiter deletes the data transfer instruction associated with said data transfer circuit that has stopped the data transfer from said instruction queue and said bus arbiter shifts contents of said instruction queue in a latter stage by one stage toward the head of said instruction queue, and (5-5) said operations (5-1) to (5-4) are repeated at least once.

9. The memory control circuit according to claim 8, wherein, in said operation (5-1), even when any of said plurality of data transfer circuits is transmitting the request signal, if specific at least one of said plurality of data transfer circuits other than said data transfer circuit that is transmitting the request signal, is transmitting the request signals or if the data transfer instruction associated with specific at least one of said plurality of data transfer circuits other than said data transfer circuit that is transmitting the request signal, is held in said instruction queue, said operation (5-2) is not executed so that said bus arbiter does not enter the data transfer instruction, which is associated with said data transfer circuit that is transmitting the request signal, into a tail of said instruction queue.

10. The memory control circuit according to claim 8, wherein, even when the data transfer instruction is held at the head of said instruction queue, if specific at least one of said plurality of data transfer circuits, which is other than said data transfer circuit associated with the data transfer instruction held at the head of said instruction queue, is transmitting the request signal or if the data transfer instruction associated with specific at least one of said plurality of data transfer circuits, which is other than said data transfer circuit associated with the data transfer instruction held at the head of said instruction queue, is held in said instruction queue, said operation (5-3) is not executed so that said bus arbiter does not transmit the acknowledge signal to said data transfer circuit associated with the data transfer instruction held at the head of said instruction queue.

11. The memory control circuit according to claim 7, wherein, even when the data transfer instruction is held in the instruction queue associated with the current state of said state machine, if specific at least one of data transfer circuits associated with states of said state machine other than the current state is transmitting their request signal, transition of the current state of said state machine takes place in accordance with the predetermined transition condition, and said bus arbiter does not transmit the acknowledge signal to the data transfer circuit associated with the data transfer instruction held at the head of said instruction queue.

12. The memory control circuit according to claim 1, wherein, even while said data transfer circuit is executing data transfer, if specific at least one of said data transfer circuits other than said data transfer circuit which is executing said data transfer starts transmission of the request signals, said bus arbiter issues an instruction to said data transfer circuit which is executing said data transfer to stop the data transfer being executed.

13. The memory control circuit according to claim 1, wherein each of said plurality of counters generates the count value on the basis of a read instruction to each of said plurality of buffers, a write instruction to said plurality of buffers, a read instruction to said memory, and a write instruction to said memory.

14. The memory control circuit according to claim 1, wherein each of said plurality of counters includes an inverted-pulse generation circuit for generating a pulse inverted each time the read or write instruction to said plurality of buffers is issued and a differentiation circuit for detecting an edge in the pulse generated by said inverted-pulse generation circuit, and wherein each of said plurality of counters generates the count value on the basis of a detection result of said differentiation circuit, the read instruction to said memory, and the write instruction to said memory.

15. The memory control circuit according to claim 1, wherein, each of said plurality of data transfer circuits generates the request signal, when the count value of each of said plurality of data transfer circuits becomes above or below a predetermined set value.

16. The memory control circuit according to claim 1, wherein, each of said plurality of data transfer circuits stops the data transfer, when the count value of each of said plurality of data transfer circuits becomes above or below a predetermined set value.

17. The memory control circuit according to claim 1, wherein, in any of said plurality of data transfer circuits which considers said memory as a transfer source and considers said buffer as a transfer destination, if all the data stored in said buffer as the transfer destination is deleted in compliance with an external signal, number of pieces of data to be transferred one time by said data transfer circuit through a predetermined duration is made smaller than number of pieces of data to be transferred through a duration other than the predetermined duration, or the number of times the acknowledge signal is transmitted by said bus arbiter in response to the request signal transmitted by said data transfer circuit is made smaller through a predetermined duration than the number of times the acknowledge signal is transmitted by said bus arbiter in response to the request signal transmitted by said data transfer circuit through the duration other than the predetermined duration.

18. A method for arbitrating a memory bus, wherein access to said memory bus by a plurality of data transfer circuits is arbitrated using a plurality of counters and a bus arbiter,
said plurality of data transfer circuits performing data transfer between a memory and a plurality of buffers using said memory bus,
said plurality of counters having count values respectively, the count values corresponding to numbers of pieces of data stored in said plurality of buffers respectively,
a bus arbiter including a state machine which has a plurality of states associated with said plurality of data transfer circuits respectively and sets one of the plurality of states as a current state, transition of the current state of said state machine taking place in accordance with a predetermined transition condition;
said method comprising the steps of:
(1) transmitting a request signal demanding start of the data transfer from each of said plurality of data transfer circuits to said bus arbiter on the basis of at least one of the count values of said plurality of counters,
(2) transmitting an acknowledge signal granting start of the data transfer from said bus arbiter to said data transfer circuit associated with the current state of said state machine, if said data transfer circuit associated with the current state of said state machine transmits the request signal to said bus arbiter,
(3) starting the data transfer of each of said plurality of data transfer circuits at receipt of the acknowledge signal from said bus arbiter in response to the request signal, and stopping the data transfer being executed on the basis of either number of pieces of data transferred after the receipt of the acknowledge signal or the count value of at least one of said plurality of counters,
(4) not transmitting the acknowledge signal to said data transfer circuit associated with the current state of said state machine, when said data transfer circuit associated with the current state of said state machine either does not transmit the request signal or has stopped the data transfer being executed, and shifting the current state of said state machine to a renewed current state in accordance with the predetermined transition condition, and
(5) repeating said steps (1) to (4).

19. The method according to claim 18,
wherein, in said step (2), even when said data transfer circuit associated with the current state of said state machine is transmitting the request signal, if specific at least one of said plurality of data transfer circuits associated with a state other than the current state of said state machine is transmitting the request signal, said bus arbiter does not transmit the acknowledge signal to said data transfer circuit associated with the current state of said state machine, and transition of the current state of said state machine to a renewed current state takes place in accordance with the predetermined transition condition.

20. The method according to claim 18,
wherein, when said state machine has a plurality of states next to the current state, said state machine sets one of the plurality of states next to the current state as a renewed current state on the basis of the request signal transmitted by specific at least one of said plurality of data transfer circuits.

21. A method for arbitrating a memory bus, wherein access to said memory bus by a plurality of data transfer circuits is arbitrated using a plurality of counters and a bus arbiter,
said plurality of data transfer circuits performing data transfer between a memory and a plurality of buffers using said memory bus,
said plurality of counters having count values respectively, the count values corresponding to numbers of pieces of data stored in said plurality of buffers respectively,
a bus arbiter including an instruction queue formed by a shift register;
said method comprising the steps of:
(1) transmitting a request signal demanding start of the data transfer from each of said plurality of data transfer circuits to said bus arbiter on the basis of at least one of the count values of said plurality of counters,
(2) entering a data transfer instruction, which is associated with at least one of said plurality of data transfer circuits that has transmitted the request signal, into a tail of said instruction queue, if said bus arbiter has received the request signal from at least one of said plurality of data transfer circuits,
(3) transmitting an acknowledge signal granting start of the data transfer from said bus arbiter to said data transfer circuit associated with a data transfer instruction held at a head of said instruction queue,
(4) starting the data transfer of each of said plurality of data transfer circuits at receipt of the acknowledge signal from said bus arbiter in response to the request signal, and stopping the data transfer being executed on the basis of either number of pieces of data transferred after the receipt of the acknowledge signal or the count value of at least one of said plurality of counters,
(5) deleting the data transfer instruction associated with said data transfer circuit that has stopped the data transfer from said instruction queue, and shifting contents of said instruction queue in a latter stage by one stage toward the head of said instruction queue, when said data transfer circuit has stopped the data transfer, and
(6) repeating said steps (1) to (5).

22. The method according to claim 21,
wherein, in said step (1), even when any of said plurality of data transfer circuits is transmitting the request signal, if specific at least one of said plurality of data transfer circuits other than said data transfer circuit that is transmitting the request signal, is transmitting the request signals or if the data transfer instruction associated with specific at least one of said plurality of data transfer circuits other than said data transfer circuit that is transmitting the request signal, is held in said instruction queue, said step (2) is not executed so that said bus arbiter does not enter the data transfer instruction, which is associated with said data transfer circuit that is transmitting the request signal, into a tail of said instruction queue.

23. The method according to claim 21,
wherein, even when the data transfer instruction is held at the head of said instruction queue, if specific at least one of said plurality of data transfer circuits, which is other than said data transfer circuit associated with the data transfer instruction held at the head of said instruction queue, is transmitting the request signal or if the data transfer instruction associated with specific at least one of said plurality of data transfer circuits, which is other than said data transfer circuit associated with the data transfer instruction held at the head of said instruction queue, is held in said instruction queue, said step (3) is not executed so that said bus arbiter does not transmit the acknowledge signal to said data transfer circuit associated with the data transfer instruction held at the head of said instruction queue.

24. A method for arbitrating a memory bus, wherein access to said memory bus by a plurality of data transfer circuits is arbitrated using a plurality of counters and a bus arbiter, said plurality of data transfer circuits performing data transfer between a memory and a plurality of buffers using said memory bus, said plurality of counters having count values respectively, the count values corresponding to numbers of pieces of data stored in said plurality of buffers respectively, a bus arbiter including an instruction queue formed by a shift register and a state machine which has a plurality of states each of which is associated with one of said plurality of data transfer circuits or the instruction queue, said state machine setting one of the plurality of states as a current state, transition of the current state of said state machine taking place in accordance with a predetermined transition condition, at least one of the plurality of states of said state machine being associated with said instruction queue, some of said plurality of data transfer circuits being associated with the plurality of states of said state machine respectively, a remainder of said plurality of data transfer circuits being associated with said instruction queue;

said method comprising the steps of:

(1) transmitting a request signal demanding start of the data transfer from each of said plurality of data transfer circuits to said bus arbiter on the basis of at least one of the count values of said plurality of counters, (2) transmitting an acknowledge signal granting start of the data transfer to said data transfer circuit associated with the current state of said state machine, when said data transfer circuit associated with the current state of said state machine transmits the request signal to said bus arbiter, (3) starting the data transfer of each of said plurality of data transfer circuits at receipt of the acknowledge signal from said bus arbiter in response to the request signal, and stopping the data transfer being executed on the basis of either number of pieces of data transferred after the receipt of the acknowledge signal or the count value of at least one of said plurality of counters, (4) not transmitting the acknowledge signal to said data transfer circuit associated with the current state of said state machine, when said data transfer circuit associated with the current state of said state machine either does not transmit the request signal or has stopped the data transfer being executed, and shifting the current state of said state machine to a renewed current state in accordance with the predetermined transition condition, (5) executing at least a part of the data transfer instructions held in said instruction queue sequentially from the head of said instruction queue, only when the current state of said state machine is associated with said instruction queue, after that transition of the current state of said state machine to a renewed current state taking place in accordance with the predetermined transition condition, and (6) repeating said steps (1) to (5).

25. The method according to claim 24, wherein, in said step (5), (5-1) if said bus arbiter receives the request signal from any of said plurality of data transfer circuits associated with said instruction queue, said bus arbiter enters the data transfer instruction associated with said data transfer circuit which has transmitted the request signal into the tail of said instruction queue, (5-2) said bus arbiter transmits the acknowledge signal granting start of the data transfer to said data transfer circuit associated with the data transfer instruction held at the head of said instruction queue, (5-3) each of said data transfer circuits associated with said instruction queue starts the data transfer at receipt of the acknowledge signal from said bus arbiter in response to the request signal, and stops the data transfer being executed on the basis of either number of pieces of data transferred after the receipt of the acknowledge signal or the count values of at least one of said plurality of counters, (5-4) when said data transfer circuit has stopped the data transfer, said bus arbiter deletes the data transfer instruction associated with said data transfer circuit that has stopped the data transfer from said instruction queue and said bus arbiter shifts contents of said instruction queue in a latter stage by one stage toward the head of said instruction queue, and (5-5) said steps (5-1) to (5-4) are repeated at least once.

26. The method according to claim 25, wherein, in said step (5-1), even when any of said plurality of data transfer circuits is transmitting the request signal, if specific at least one of said plurality of data transfer circuits other than said data transfer circuit that is transmitting the request signal, is transmitting the request signals or if the data transfer instruction associated with specific at least one of said plurality of data transfer circuits other than said data transfer circuit that is transmitting the request signal, is held in said instruction queue, said step (5-2) is not executed so that said bus arbiter does not enter the data transfer instruction, which is associated with said data transfer circuit that is transmitting the request signal, into a tail of said instruction queue.

27. The method according to claim 25, wherein, even when the data transfer instruction is held at the head of said instruction queue, if specific at least one of said plurality of data transfer circuits, which is other than said data transfer circuit associated with the data transfer instruction held at the head of said instruction queue, is transmitting the request signal or if the data transfer instruction associated with specific at least one of said plurality of data transfer circuits, which is other than said data transfer circuit associated with the data transfer instruction held at the head of said instruction queue, is held in said instruction queue, said step (5-3) is not executed so that said bus arbiter does not transmit the acknowledge signal to said data transfer circuit associated with the data transfer instruction held at the head of said instruction queue.

28. The method according to claim 24, wherein, even when the data transfer instruction is held in the instruction queue associated with the current state of said state machine, if specific at least one of data transfer circuits associated with states of said state machine other than the current state is transmitting their request signal, transition of the current state of said state machine takes place in accordance with the predetermined transition condition, and said bus arbiter does not transmit the acknowledge signal to the data transfer circuit associated with the data transfer instruction held at the head of said instruction queue.

29. The method according to claim 18, wherein, even while said data transfer circuit is executing data transfer, if specific at least one of said data transfer circuits other than said data transfer circuit which is executing said data transfer starts transmission of the request signals, said bus arbiter issues an instruction to said data transfer circuit which is executing said data transfer to stop the data transfer being executed.

30. The method according to claim 18, wherein each of said plurality of counters generates the count value on the basis of a read instruction to each of said plurality of buffers, a write instruction to said plurality of buffers, a read instruction to said memory, and a write instruction to said memory.

31. The method according to claim 18, wherein each of said plurality of counters includes an inverted-pulse generation circuit for generating a pulse inverted each time the read or write instruction to said plurality of buffers is issued and a differentiation circuit for detecting an edge in the pulse generated by said inverted-pulse generation circuit, and wherein each of said plurality of counters generates the count value on the basis of a detection result of said differentiation circuit, the read instruction to said memory, and the write instruction to said memory.

32. The method according to claim 18, wherein, each of said plurality of data transfer circuits generates the request signal, when the count value of each of said plurality of data transfer circuits becomes above or below a predetermined set value.

33. The method according to claim 18, wherein, each of said plurality of data transfer circuits stops the data transfer, when the count value of each of said plurality of data transfer circuits becomes above or below a predetermined set value.

34. The method according to claim 18, wherein, in any of said plurality of data transfer circuits which considers said memory as a transfer source and considers said buffer as a transfer destination, if all the data stored in said buffer as the transfer destination is deleted in compliance with an external signal, number of pieces of data to be transferred one time by said data transfer circuit through a predetermined duration is made smaller than number of pieces of data to be transferred through a duration other than the predetermined duration, or the number of times the acknowledge signal is transmitted by said bus arbiter in response to the request signal transmitted by said data transfer circuit is made smaller through a predetermined duration than the number of times the acknowledge signal is transmitted by said bus arbiter in response to the request signal transmitted by said data transfer circuit through the duration other than the predetermined duration.

* * * * *